(12) United States Patent
Fukushima et al.

(10) Patent No.: US 6,978,467 B1
(45) Date of Patent: Dec. 20, 2005

(54) AUTO-LOADING DISK PLAYER

(75) Inventors: Yoshimitsu Fukushima, Tokorozawa (JP); Hiroyuki Watanabe, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 706 days.

(21) Appl. No.: 09/709,467

(22) Filed: Nov. 13, 2000

(30) Foreign Application Priority Data

Nov. 12, 1999 (JP) ................................. 11-322741

(51) Int. Cl.[7] .......................................... G11B 17/04
(52) U.S. Cl. ..................................................... 720/624
(58) Field of Search ..................... 369/77.1; 720/624

(56) References Cited

U.S. PATENT DOCUMENTS

| 4,507,768 A | * | 3/1985 | Ikedo et al. ................. 720/624 |
| 4,561,084 A | | 12/1985 | Satake et al. |
| 4,675,858 A | * | 6/1987 | d'Alayer de Costemore d'Arc .......................... 369/77.1 |
| 5,260,925 A | * | 11/1993 | Camps et al. ................ 720/624 |
| 5,416,763 A | * | 5/1995 | Ohsaki ........................ 369/77.1 |
| 6,243,347 B1 | * | 6/2001 | Kawana et al. ............. 369/77.1 |
| 6,545,966 B1 | * | 4/2003 | Lin ............................. 369/75.1 |
| 2002/0044519 A1 | * | 4/2002 | Kabasawa .................. 369/77.1 |

FOREIGN PATENT DOCUMENTS

JP          59087676          5/1984

* cited by examiner

*Primary Examiner*—David Davis
(74) *Attorney, Agent, or Firm*—Sughrue Mion, PLLC

(57) ABSTRACT

A disk player is provided which is capable of being automatically loaded with and playing one of a plurality of types of disks when the disk is inserted in the disk player. A driver moves the receiving module from an opened position to a closed position in response to either the detection signal from disk detector or the command signal from a switch.

2 Claims, 19 Drawing Sheets

AUTO-LOADING DISK PLAYER

BACKGROUND OF THE INVENTION

1. Field of the Invention

The present invention relates to a disk player of the so-called "slot-in type".

2. Description of the Related Art

As well known in the art, there are compact disks (CD) disk-shaped recording media having two sizes of external diameters of 120 mm and 80 mm (as will be called the "12 cm CD" and the "8 cm CD", respectively).

In the prior art, there is known a disk player of the slot-in type which can pull in even the disk of either the 12 cm CD or the 8 cm disk automatically in the player body and can position it on play means (or reproduction means) for playing (or reproducing) it when the disk is inserted into a disk insertion slot formed in the player casing.

OBJECTS AND SUMMARY OF THE INVENTION

This disk player of the slot-in type may be adversely affected in its reproducing function by the dust which will come from the disk slot into the player body.

It is, therefore, an object of the invention to provided a disk player having a highly operation re liability, capable of being automatically loaded with and playing one of discs of a plurality of kinds including the 12 cm CD, 8 cm CD and Maxi-CD when the disk is inserted into its slot.

According to an aspect of the invention, there is provided a disk player comprising: a main chassis for enclosing play means for playing a disk; a receiving module having a slot into which the disk is to be inserted; disk transfer means for transferring the disk inserted into the slot; disk detecting means for detecting the position of the disk inserted; and drive means for moving the receiving module between a closed position and an opened position spaced from the closed position. The disk player further comprises switch means controlled by the user for issuing a drive starting command to start the drive of the drive means. The disk detecting means generates a detection signal when the disk arrives at a predetermined position. The drive means moves the receiving module from the opened position to the closed position in response to either the detection signal from the disk detecting means or the command signal from the switch means.

DETAILED DESCRIPTION OF THE PREFERRED EMBODIMENT

A disk player is described as an embodiment according to the invention with reference to the accompanying drawings.

Figure 1:
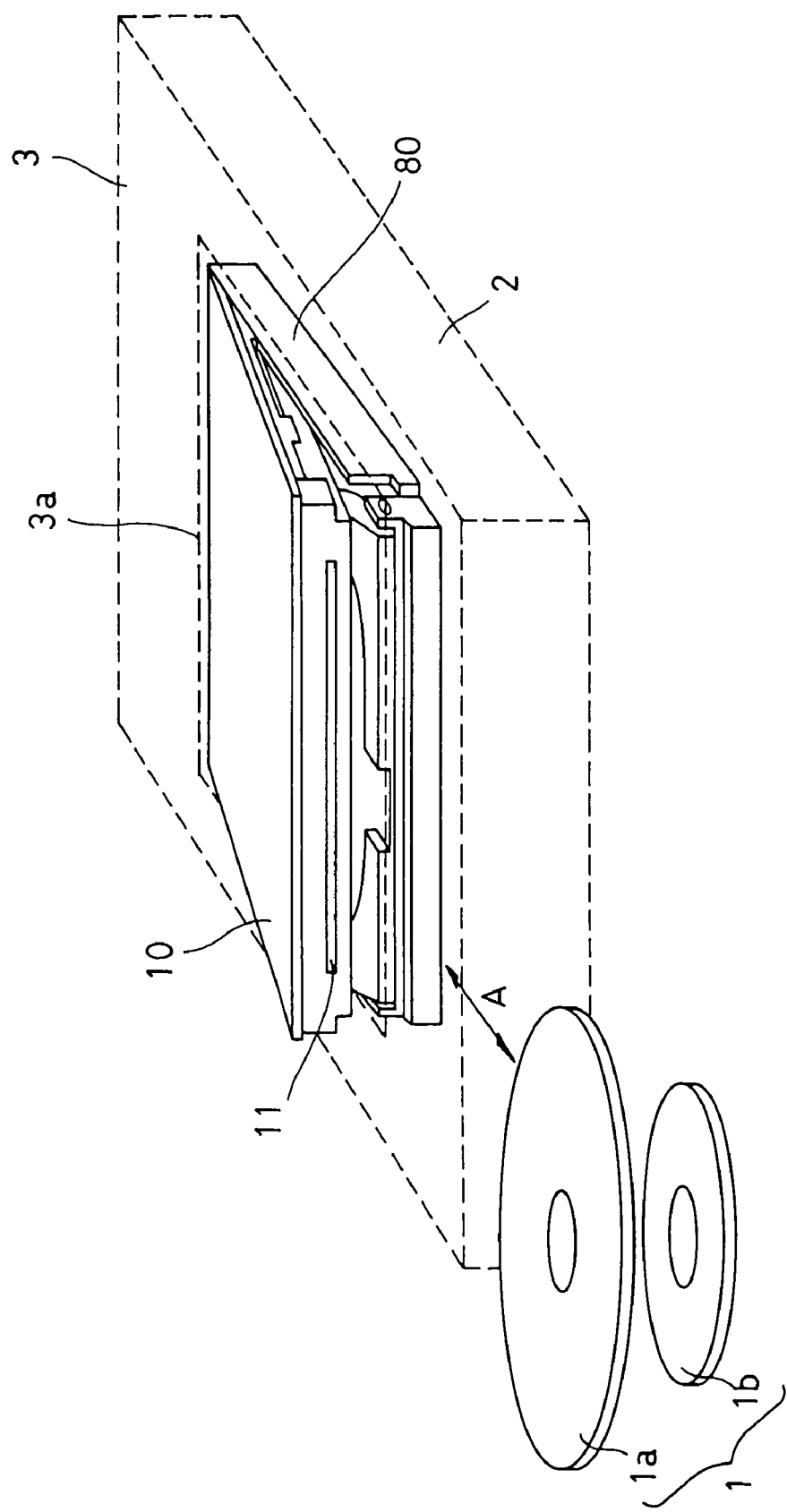
FIG. 1 is a conceptional diagram of a disk player according to the invention.

In the disk player according to the invention, as shown in FIG. 1, there can be freely inserted and extracted in the directions of arrows A, any one of a plurality of kinds of disks including a 12 cm CD, 8 cm CD and a Maxi-CD. In a panel portion 3 of a player casing 2, there is formed a generally square aperture 3a. In the vicinity of this aperture 3a, there is fixed a main chassis 80. An openable chassis 10 constructing a receiving module is so hinged at its one end portion to the main chassis 80 as to open/close the aperture 3a freely. When the openable chassis 10 is opened (or popped up), as will be described in more detail, a slit 11 or a slot for inserting the disk 1 therethrough is exposed over the panel portion 3 so that the disk 1 can be inserted. This is a disk player of the kind called the "pop-up type" or the "slot-in type".

Figure 2:
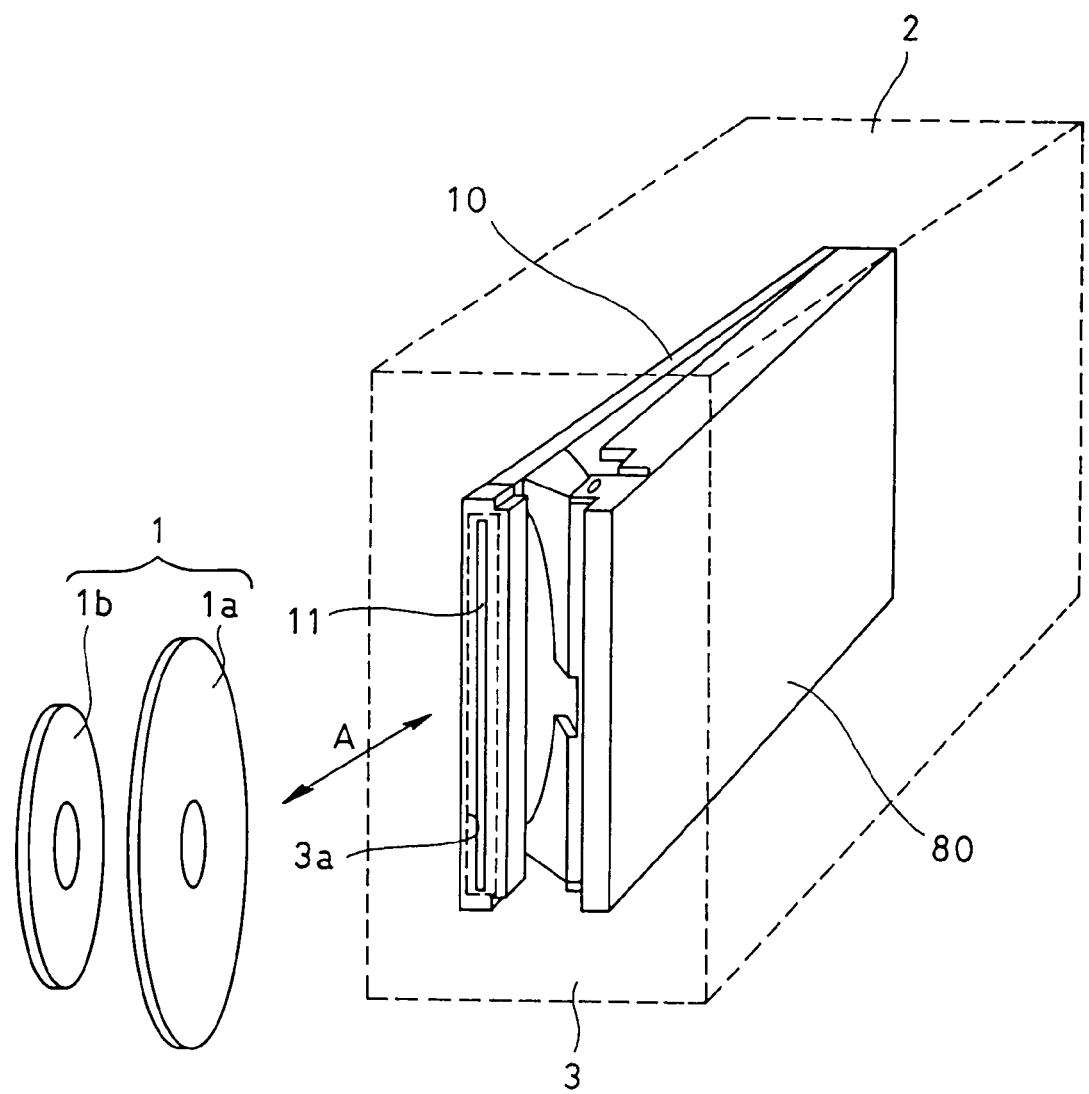
FIG. 2 is a conceptional diagram of a disk player according to the invention.
Figure 3:
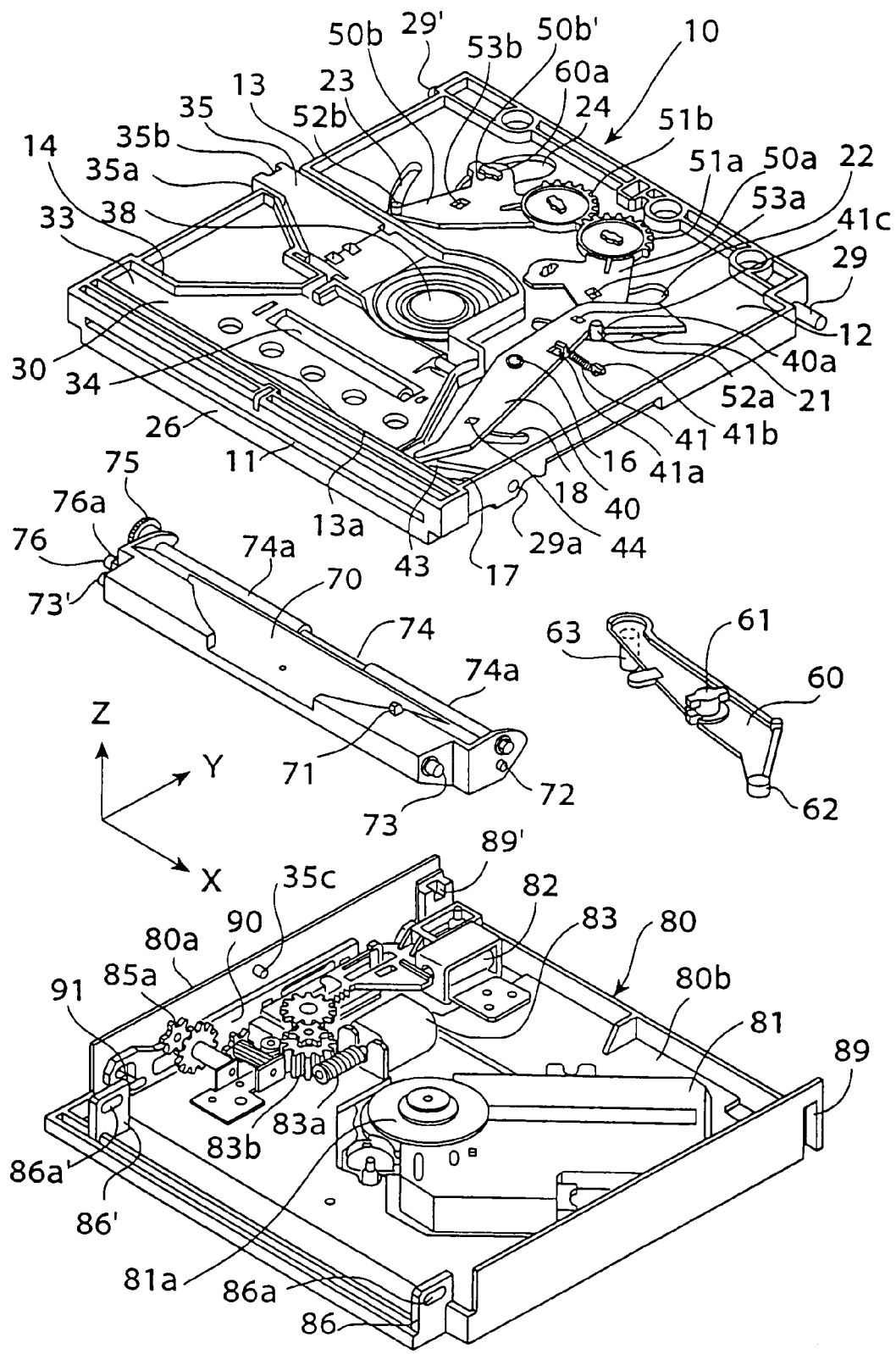
FIG. 3 is a partially exploded perspective view of an essential portion of the disk player according to the invention.
Figure 4:
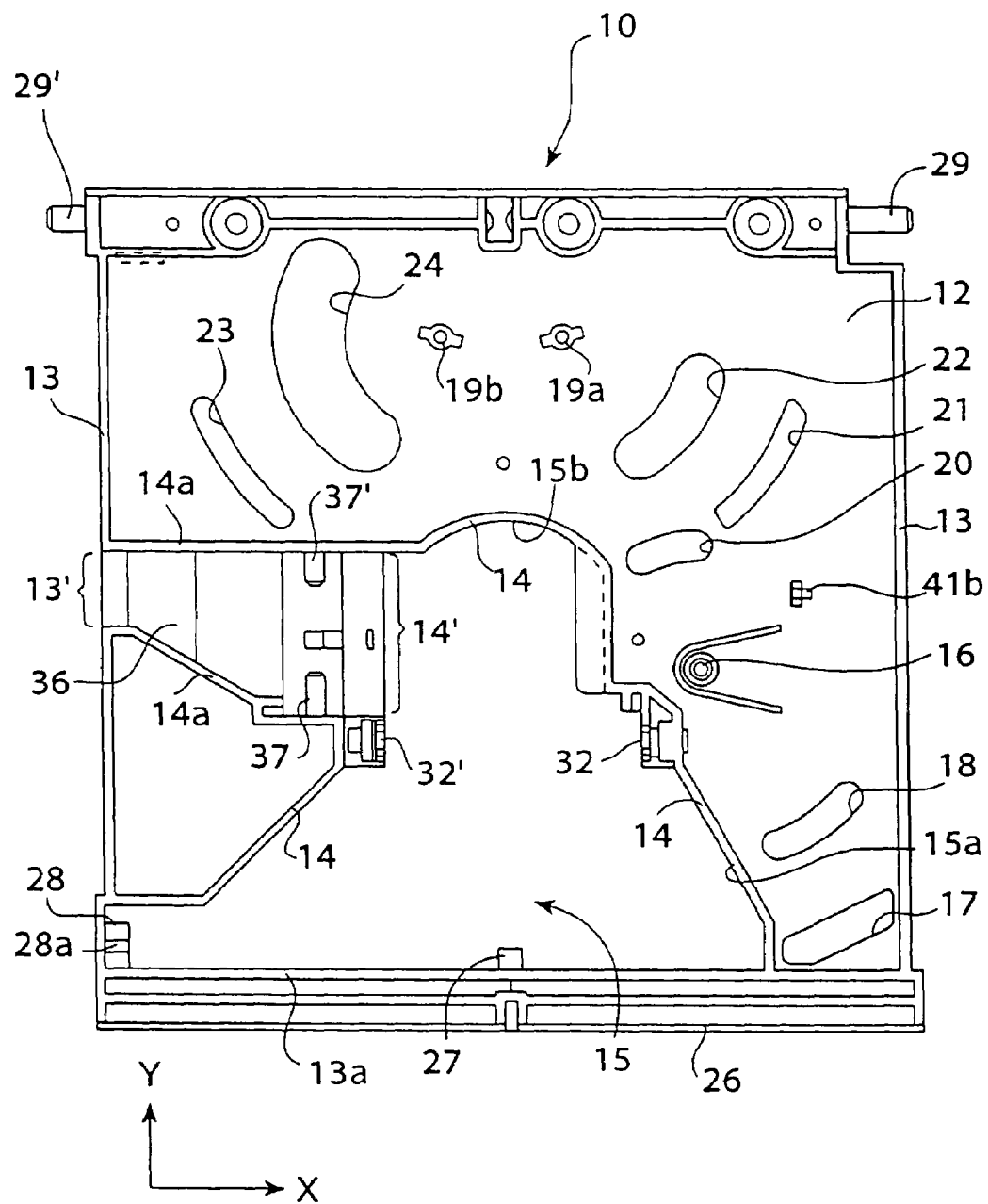
FIG. 4 is a top plan view of an openable chassis.

As shown in FIG. 2, any single disk 1 can also be inserted/extracted in the A-directions into/from another disk player according to the invention. In the panel portion 3, there is formed the rectangular aperture 3a, in the vicinity of which the openable chassis 10 may be fixed from the back face of the panel portion 3 with the slit 11 being directed forward. This is a disk player of the kind called the "front-loading/slot-in type".

In the mode shown in FIGS. 1 and 2, the openable chassis 10 and the main chassis 80 share their structures.

As shown in FIGS. 3 to 9, the openable chassis 10 is molded of a resin into a flat plate shape of a generally square shape, as viewed downward, and is integrally composed of a flat plate portion 12, an outer peripheral wall 13 and a rib 14. Here, it will be assumed that: a rightward direction is taken in arrow X; a backward direction is taken in arrow Y; and an upward direction is taken in arrow Z.

The flat plate portion 12 is enclosed at its peripheral edge portion by the outer peripheral wall 13 and is extended in the X-Y plane in the outer peripheral wall 13. The flat plate portion 12 has a removed portion 15 by removing the openable chassis 10 in a generally triangular shape from the front of the vicinity of the center portion thereof. In this removed portion 15 at its generally trapezoidal rocking plate accommodating portion 15a located in front, there is arranged a rocking plate 30, as will be described hereinafter. In a clamper accommodating portion 15b in the vicinity of the center portion, on the other hand, there is arranged a clamper 38, as will also be described hereinafter.

On the flat plate portion 12 in the vicinity of the righthand side of the removed portion 15, there is fixed a bearing 16 for mounting a disk diameter detecting plate 40, as will be described hereinafter. Concentrically of the bearing 16, there are formed through the flat plate portion 12 a disk diameter detecting pin slot 17, a slot 18 and a slot 20. On the flat plate portion 12 at the back of the removed portion 15, on the other hand, there are formed bearings 19a and 19b for mounted a pair of disk holding plates (right) 50a and disk holding plate (left) 50b, as will be described hereinafter. Concentrically of the bearing 19a, there are formed through the flat plate portion 12 two slots, i.e., a slot 21 for the back guide pin (right) and a holding plate stopper slot 22. Likewise, concentrically of the bearing 19b, there are formed two slots, i.e., a slot 23 for a back guide pin (left) and a holding plate stopper slot 24.

The outer peripheral wall 13 defines the outer edge of the openable chassis 10 into a generally square shape. The outer peripheral wall 13 is extended but for its front portion 13a in two upward and downward directions from the X-Y plane in which the flat plate portion 12 is arranged. In short, the openable chassis 10 has a generally H-shaped section along the X-Z plane. Here, the front portion 13a of the outer peripheral wall 13 is extended only upward from the X-Y plane in which the flat plate portion 12 is arranged. In a portion of the outer peripheral wall 13 on the lefthand side of the openable chassis 10, on the other hand, there is formed a clamper mounting portion 13' which is extended only downward from the X-Y plane where the flat plate portion 12 is arranged.

In the front portion 13a of the outer peripheral wall 13, there is removably or integrally mounted a front panel 26. In this front panel 26, there is formed the slit 11 which is transversely elongated to have a length of the diameter of the 12 cm CD, i.e., about 120 mm. The slit 11 is located slightly below the X-Y plane in which the flat plate portion 12 is arranged. Therefore, the disk 1 to be played is allowed to come into and out of the player through the slit 11 along the lower face of the flat plate portion 12, as will be described hereinafter.

With the front portion 13a of the outer peripheral wall 13, there is integrally formed a stopper 27 which is protruded into the rocking plate accommodating portion 15a. Here, the stopper 27 is located over the X-Y plane in which the flat plate portion 12 is arranged. On the outer peripheral wall 13 of the lefthand end portion of the rocking plate accommodating portion 15a, on the other hand, there is fixed a micro-switch 28 which has a switch lever 28a directed upward.

In the vicinities of the two side portions of the back end of the outer peripheral wall 13, there is embedded one set of stationary pins 29 and 29' which are elongated oppositely of each other. These stationary pins 29 and 29' engage with bearings 89 and 89' formed in the vicinity of the back end portion of the main chassis 80, to allow this main chassis 80 to turn on the stationary pins 29 and 29', as will be described hereinafter. Therefore, the openable chassis 10 can rock relative to the later-described main chassis 80.

The internal rib 14 is extended upward from the X-Y plane in which the flat plate portion 12 is arranged. The internal rib 14 is formed along the peripheral edge portion of the removed portion 15 of the flat plate portion 12. In short, the internal rib 14 defines the peripheral edge portion of the removed portion 15 together with the outer peripheral wall 13. In the edge portion of the clamper accommodating portion 15b, there is partially formed a clamper mounting portion 14' in which the internal rib 14 is not formed. Joining the clamper mounting portion 14' of the internal rib 14 and the clamper mounting portion 13' of the outer peripheral wall 13, two ribs 14a are formed which are extended upward from the flat plate portion 12. In a clamp accommodating portion 36 between the two ribs 14a, there is arranged a clamper holding member 35, as will be described hereinafter. In the clamp accommodating portion 36, on the other hand, clamper fixing pins 37 and 37' are formed which are elongated from the individual ribs 14a so as to confront each other.

Figure 5:
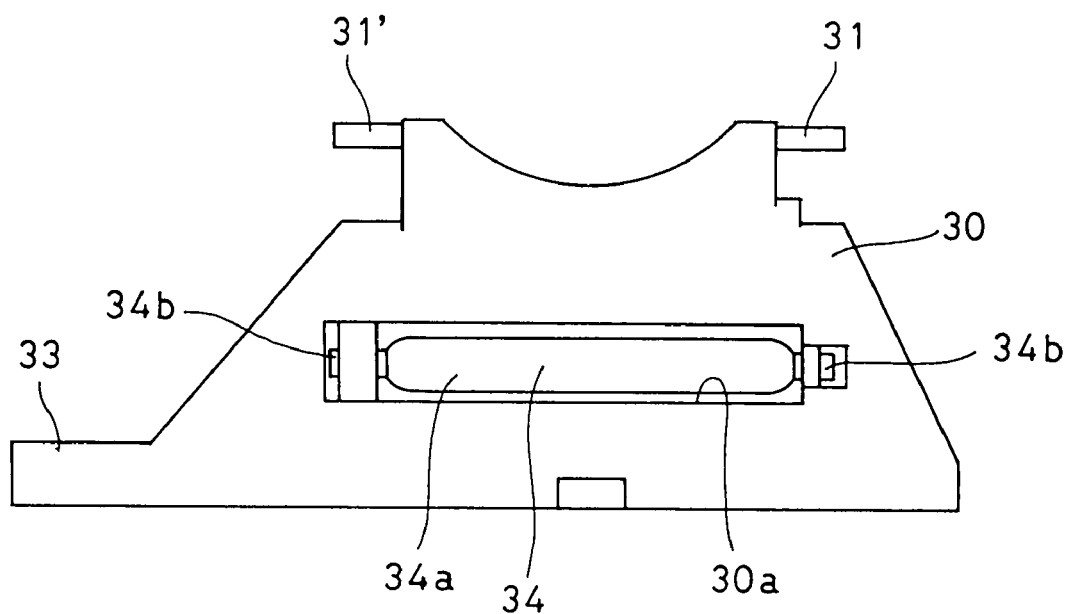
FIG. 5 is a top plan view of a periphery of a rocking plate.

With specific reference to FIG. 5, the rocking plate 30 is a plate member which has a generally trapezoidal shape, as viewed downward, and which is arranged in the rocking plate accommodating portion 15a of the openable chassis 10. In the vicinity of the back end portion of the rocking plate 30, there are embedded one set of stationary pins 31 and 31' which are transversely elongated oppositely of each other. These stationary pins 31 and 31' turnably engage with bearings 32 and 32' which are formed in the internal ribs 14 at the back end portion of the rocking plate accommodating portion 15a. Around the stationary pin 31, there is wound a not-shown torsion spring for biasing the rocking plate 30 in a direction to turn the front end portion of the rocking plate 30 downward on the stationary pins 31 and 31'. So long as no force is applied to lift the front end portion of the rocking plate 30, therefore, this front end portion abuts downward against the stopper 27 projected into the rocking plate accommodating portion 15a so that the rocking plate 30 is stopped at the abutting position. At this time, the rocking plate 30 abuts at its end portion 33 against the micro-switch 28 to depress the switch lever 28a. In this state, the micro-switch 28 is ON. This micro-switch 28 is a switch for turning ON/OFF the power supply passage to a later-described motor 83 so that it supplies the motor 83 with an electric power when turned ON.

Figure 10:
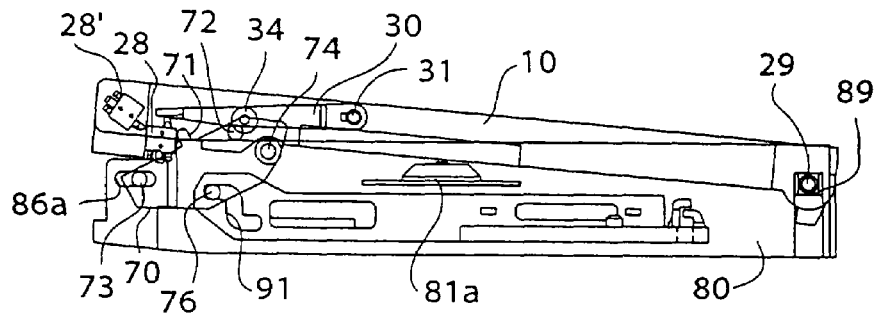
FIG. 10 is a side elevation of an essential portion of the disk player before a disk is inserted.
Figure 11:
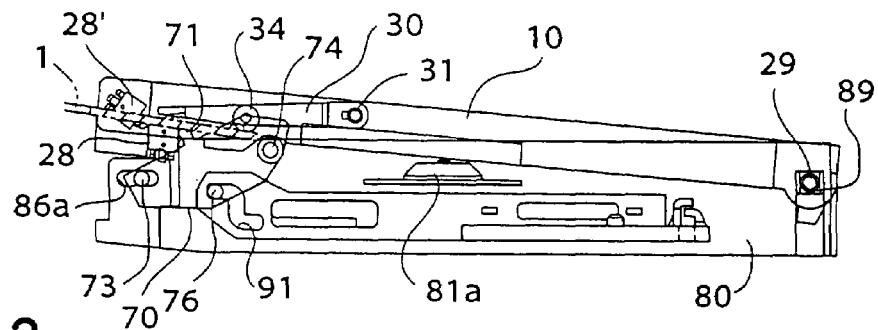
FIG. 11 is a side elevation of the essential portion of the disk player when the disk is inserted.
Figure 12:
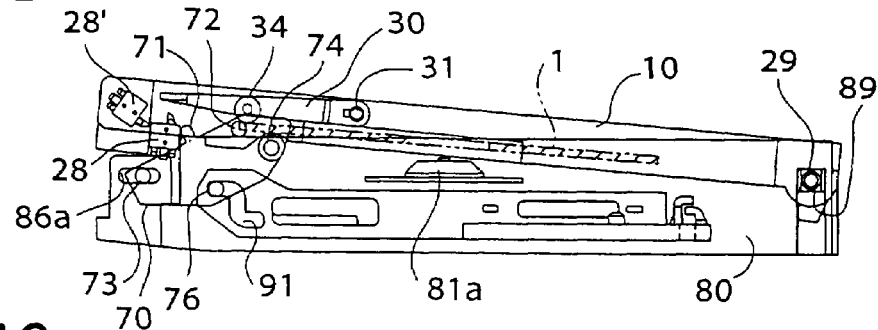
FIG. 12 is a side elevation of the essential portion of the disk player when the disk is transferred to a playing mechanism.

In the vicinity of the micro-switch 28, moreover, there is fixed another micro-switch 28' which has a switch lever directed backward (as should be referred to FIG. 10). This micro-switch 28' is a switch coactive with the micro-switch 28 for turning ON/OFF the power supply passage to the motor 83. In this state, the micro-switch 28' is ON. Even when the micro-switch 28 is OFF, the power supply to the motor 83 is blocked if the micro-switch 28' is OFF, as will be described in detail.

At the center portion of the rocking plate 30, there is formed a rectangular aperture 30a which is transversely elongated to arrange a disk feeding follower roller 34 therein. This disk feeding follower roller 34 is protruded at least partially at its surface 34a downward from the lower face of the rocking plate 30 so that its spindles 34b are born in the two transverse end portions of the aperture 30a.

The rocking plate 30, the disk feeding follower roller 34, the micro-switch 28 thus far described constitute the disk detecting means for detecting the insertion of a disk from the slit 11.

Here, the disk feeding follower roller 34 has a function to abut against the upper face of the disk to push it onto a disk feeding drive roller 74, as will be described hereinafter. Therefore, the aperture 30a and the disk feeding follower roller 34 may take another construction if they are a mechanism having such function. This may be exemplified by a simple construction in which a block member having a low coefficient of friction is held below the rocking plate 30.

The clamper holding member 35 is extended over in the clamper accommodating portion 36. The clamper holding member 35 is provided at its lefthand end portion with a depending portion 35a. This depending portion 35a has a U-shaped notch 35b opened upward. Against the lower end portion of the notch 35b, there downward abuts a stopper pin 35c which is protruded inward from the lefthand side wall 80a of the main chassis 80, as will be described hereinafter. The clamper holding member 35 is provided at its other end portion with the clamper 38 for clamping the disk 1 on the turntable. Here, the clamper holding member 35 is caused to engage turnably with the clamper fixing pins 37 and 37' by the not-shown bearings formed on the lower face. Around the clamper fixing pin 37, moreover, there is wound the not-shown torsion spring for biasing the clamper 38 downward on the clamper fixing pins 37 and 37'. Since the clamper stopper pin 35c abuts against the lower end portion of the notch 35b of the depending portion 35a of the clamper holding member 35, however, the clamper 38 is located and stopped over the X-Y plane in which the flat plate portion 12 is extended.

The disk diameter detecting plate 40 is a flat plate having a bent portion 40a bent rightward and hinged turnably on the bearing 16 of the flat plate portion 12 of the openable chassis 10. The disk diameter detecting plate 40 is provided in the vicinity of the bent portion 40a with a projection 41a erected upward, and a coil spring 41 is mounted between the projection 41a and a projection 41b erected on the flat plate portion 12. On the other hand, a projection 41c projected downward is disposed in the vicinity of the bent portion 40a and is arranged slidably in the stopper slot 20 of the flat plate portion 12 of the openable chassis 10. Therefore, the front end portion of the disk diameter detecting plate 40 is biased on the bearing 16 toward the rocking plate 30. So long as no force is applied for turning the disk diameter detecting plate 40 counter-clockwise, as viewed downward, on the bearing 16, however, a disk detecting pin 43 abuts against the lefthand end portion of the slot 17 for the disk diameter detecting pin so that the disk diameter detecting pin 40 is stopped at that abutting position.

The disk diameter detecting plate 40 is further provided at its front end portion with the disk detecting pin 43 protruded downward. This disk detecting pin 43 has an end portion protruded through the disk diameter detecting pin slot 17 of the flat plate portion 12 to below the X-Y plane in which the flat plate portion 12 extends. The disk detecting pin 43 is provided at its back with the projection 44 protruded downward. This projection 44 is made slidable in the slot 18 of the flat plate portion 12.

The disk holding plates 50a and 50b are flat plates of the same shape. Of these, the (righthand) disk holding plate 50a is turnably hinged on the bearing 19a of the flat plate portion 12 of the openable chassis 10. Likewise, the (lefthand) disk holding plate 50b is turnably hinged on the bearing 19b of the flat plate portion 12 of the openable chassis 10. The disk holding plates 50a and 50b are provided at their back end portions with generally semicircular portions, respectively around which there are disposed gears 51a and 51b. These gears 51a and 51b mesh with each other to turn the disk holding plates 50a and 50b synchronously in the opposite directions and by the same angles on the bearings 19a and 19b, respectively.

The disk holding plate 50a is provided at its front end portion with a pin 52a which is extended both upward and downward. Likewise, the disk holding plate 50b is provided at its front end portion with a pin 52b which is extended both upward and downward. These pins 52a and 52b are extended through the back disk guide pin slots 21 and 23, respectively, so that the disk holding plates 50a and 50b are restricted in their turning ranges on the bearings 19a and 19b, respectively. The upward elongated portion of the pin 52a of the disk holding plate 50a engages with the bent portion 40a of the disk diameter detecting plate 40.

In the disk holding plates 50a and 50b at the backs of the pins 52a and 52b, respectively, there are formed stoppers 53a and 53b which are protruded downward. These stoppers 53a and 53b are positioned in the holding plate stopper slots 22 and 24 of the flat plate portion 12, to prevent the disk holding plates 50a and 50b from coming out of the flat plate portion 12.

An insertion end detecting plate 60 extends in parallel with the flat plate portion 12 of the openable chassis 10 and along the lower side of the flat plate portion 12. A mounting pin 61, as disposed in the vicinity of the center portion of the insertion end detecting plate 60, is extended from the lower face to the upper face of the flat plate portion 12 through the holding plate stopper slot 24 formed in the flat plate portion 12, and is rotatably hinged in a mounting portion 60a of a die protrusion 50b' of the (lefthand) disk holding plate 50b. Here, a not-shown coil spring is wound around the mounting portion 60a, to bias the insertion end detecting plate 60 counter-clockwise, as viewed downward, with respect to the (lefthand) disk holding plate 50b.

In the two end portions of the insertion end detecting plate 60, there are embedded a disk pin 62 and a start pin 63 which are elongated downward. Of these, the start pin 63, as embedded in the lefthand end portion, engages with a link hole 100a of a clamp starting plate 100 which is attached to the later-described main chassis 80. Around the mounting shaft 61, there is wound a not-shown coil spring bias the insertion end detecting plate 60 clockwise, as viewed downward, on the mounting shaft 61 with respect to the (lefthand) disk holding plate 50b.

Figure 6:
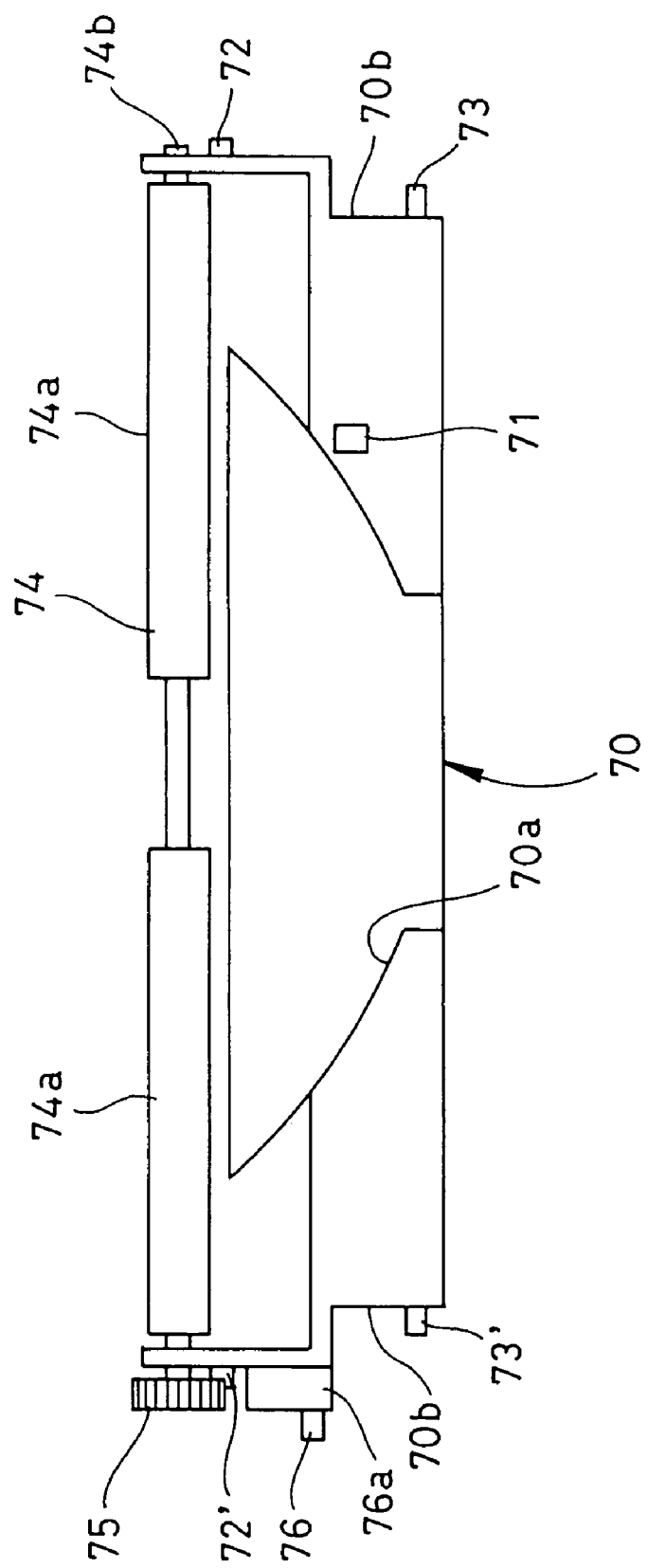
FIG. 6 is a top plan view of a periphery of a drive roller holder.

With specific reference to FIG. 6, a drive roller holder 70 is a block made of a resin. This drive roller holder 70 is provided from its back end portion to the front with a disk relief groove 70a which is cut in a generally arcuate shape in the surface. On the righthand side of the disk relief groove 70a, there is projected an upward projection 71. On the side face in the vicinity of the back end portion of the drive roller holder 70, there are formed pins 72 and 72' which are protruded oppositely of each other in the transverse directions. These pins 72 and 72' are inserted into one set of through holes 29a and 29a' (although the latter 29a' is not shown), respectively, which are formed in the vicinity of the front end portion of the outer peripheral wall 13 of the openable chassis 10. In the vicinity of the front end portion of the drive roller holder 70, on the other hand, there is formed a stepped portion 70b, on which pins 73 and 73' are protruded oppositely of each other in the transverse directions. These pins 73 and 73' are turnably inserted into through holes 86a and 86a' formed in stays 86 and 86' of the later-described main chassis 80.

In the back end portion of the drive roller holder 70, there are rotatably hinged the two end portions of the disk feeding drive roller 74. It is preferable that the disk feeding drive roller 74 is made at its roller surface 74a of an elastic material having a high coefficient of friction such as rubber. In the invention, as will be described hereinafter, the insertion of the disk 1 into the slit 11 is detected by the fact that the disk feeding follower roller 34 is moved relative to the disk feeding drive roller 74. It is, therefore, preferred that the disk feeding drive roller 74 is located at the back of the position of the disk feeding follower roller 34 in the disk inserting direction. Moreover, a portion of the roller surface 74a of the disk feeding drive roller 74 is positioned over at least a portion of the roller surface 34a of the disk feeding follower roller 34 (as should be referred to FIG. 14). On the other hand, the lefthand end portion of a stem 74b of the disk feeding drive roller 74 is protruded sideways through the drive roller holder 70, and a drive gear 75 is fixed on the protrusion. In the vicinity of the drive gear 75, a cam pin 76 is embedded in a mounting portion 76a. This cam pin 76 is located away from the lefthand side of the drive gear 75.

As has been described hereinbefore, the receiving module of the disk is constructed to include the openable chassis 10 and so on.

The main chassis 80 is a chassis made of a resin to have a generally U-shaped section, as viewed from the front. At the center portion of the main chassis 80, there is arranged a turntable 81a. In the vicinity of this turntable 81a, there is arranged a playing mechanism 81 including an optical pickup or the like.

Figure 7:
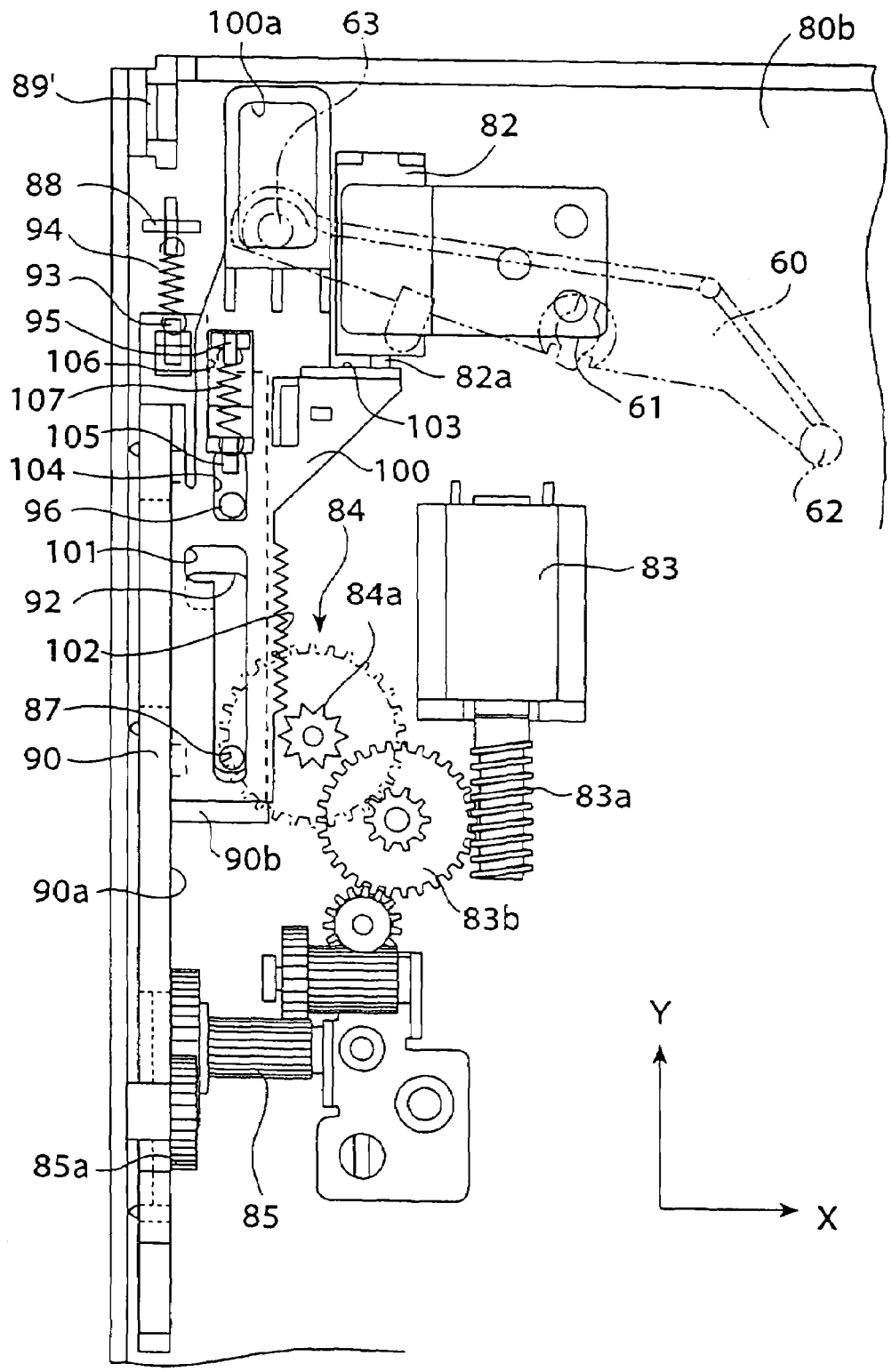
FIG. 7 is a top plan view of an essential portion of a main chassis.
Figure 8:
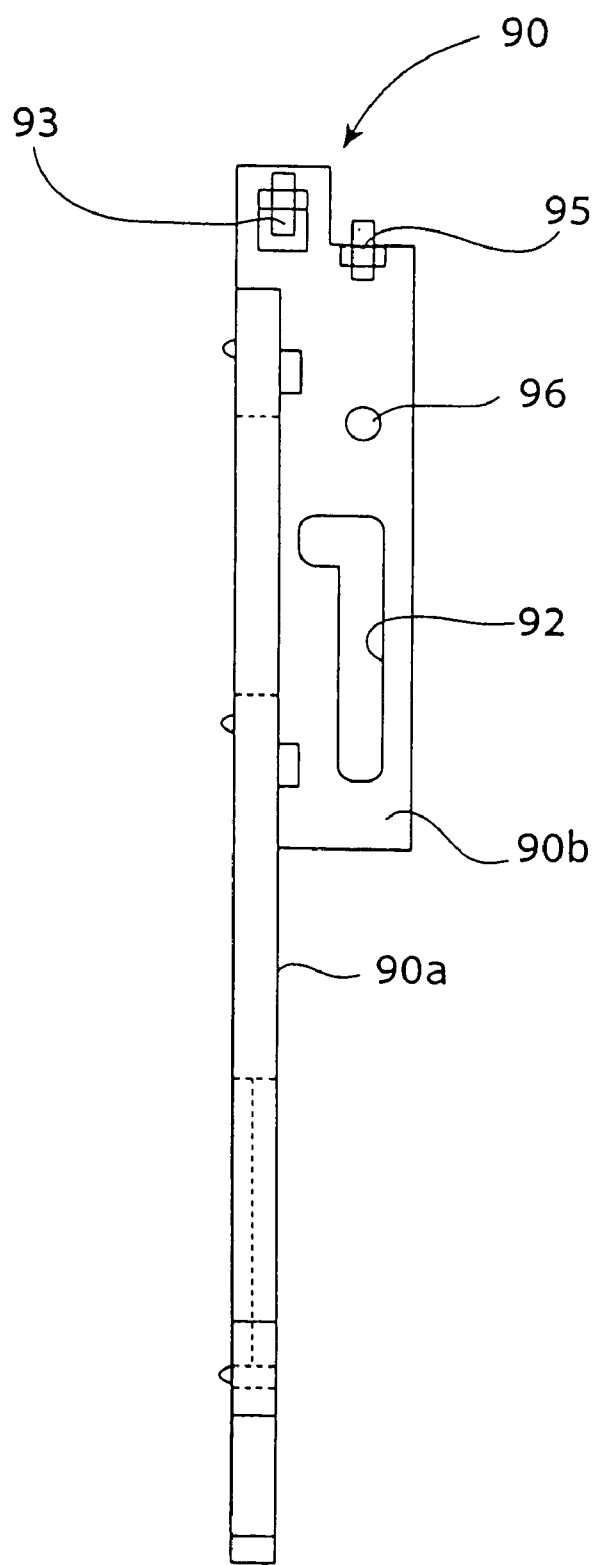
FIG. 8 is a top plan view of a cam plate.
Figure 9:
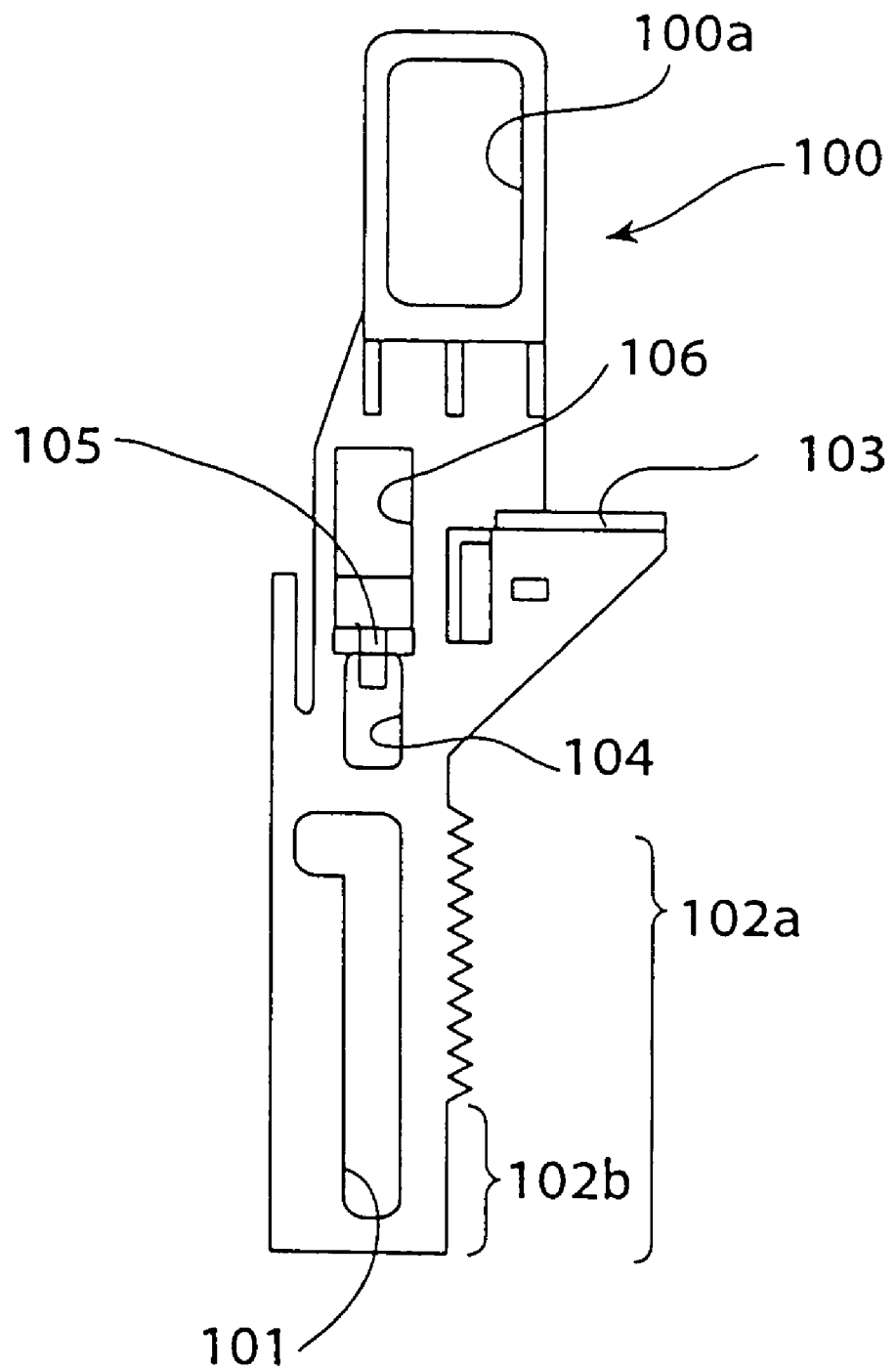
FIG. 9 is a top plan view of a clamp starting plate.
Figure 25:
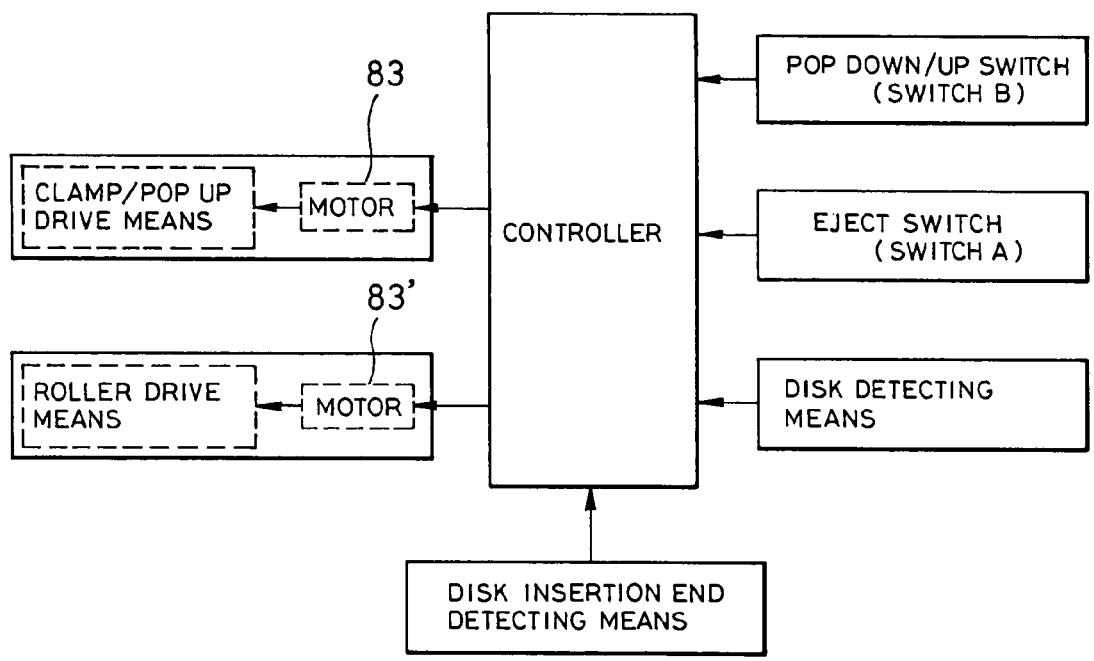
FIG. 25 is a diagram of the mechanism for a 2-motor type disk player.

In the vicinity of the back end portion of the main chassis 80, as specifically shown in FIG. 7, there is arranged an electromagnetic plunger 82. This electromagnetic plunger 82 is provided with a plunger pin 82a which is protruded forward when fed with the electric power. In front of the electromagnetic plunger 82, there is arranged the motor 83. This motor 83 is activated to rotate by the electric power when the micro-switch 28 is OFF and when the micro-switch 28' is ON. In other words, the motor 83 does not rotate when the micro-switch 28' is OFF even when the micro-switch 28 is OFF. The rotational output of the motor 83 is distributed through a worm gear 83a and a distribution gear 83b to a first gear unit 84 and a second gear unit 85 (1-motor type). Here, this construction may be modified such that the first gear unit 84 and the second gear unit 85 are provided with different motors (motors 83 and 83' as shown in FIG. 25) acting as the individual drive sources for the rotations by using neither the worm gear 83a nor the distribution gear 83b(2-motor type).

In the vicinity of the front end portion of the main chassis 80, there are erected the stays 86 and 86' which are elongated upward. These stays 86 and 86' are provided at their protruded end portions with the elongated through holes 86a and 86a' which are elongated in the longitudinal directions. With these through holes 86a and 86a', there rotatably engage the pins 73 and 73' of the drive roller holder 70. On the other hand, the drive gear 75, as fixed on the lefthand end portion of the disk feeding drive roller 74, meshes with a gear 85a of the second gear unit 85.

In the vicinity of the back end portion of the main chassis 80, there are formed the bearings 89 and 89', which rotatably engage with one set of stationary pins 29 and 29' fixed in the vicinity of the back end portion of the openable chassis 10.

A cam plate 90 has a generally L-shaped section, as viewed from the front. Specifically, the cam plate 90 has a vertical plate portion 90a extending vertically in the Y-Z plane, and a horizontal plate portion 90b extending rightly from the vicinity of the back end portion of the former in the X-Y plane. The cam plate 90 can slide back and forth along the corner of the lefthand wall 80a and the bottom face 80b of the main chassis 80.

In the vicinity of the front end portion of the vertical plate portion 90a, there is formed a clamp cam hole 91 (as should be referred to FIG. 10), which is a generally Z-shaped through hole elongated horizontally backward, bent to depend and bent again to extend horizontally. In this clamp cam hole 91, there slidably engages the cam pin 76 of the drive roller holder 70.

In the horizontal plate portion 90b, there is formed an inverted L-shaped cam hole 92, into which there is inserted a pin 87 elongated upward from the main chassis 80. In the vicinity of the back end portion of the horizontal plate portion 90b, there is formed a projection 93 which mounts a coil spring 94 between itself and a projection 88 formed on the bottom face 80b of the back end portion of the main chassis 80, to bias the cam plate 90 backward. So long as no force is applied to push the cam plate 90 forward, therefore, the pin 87 abuts against the front end portion of the cam hole 92 so that the cam plate 90 stops at this position. On the other hand, the cam pin 76 of the drive roller holder 70 is positioned at the front end portion of the clamp cam hole 91 (as should be referred to FIG. 10). From the back end portion of the horizontal plate portion 90b, there is projected a spring receiver 95, in front of which there is erected upward a guide pin 96.

The clamp starting plate 100 is provided in the vicinity of its front end portion with a cam hole 101 having an inverted L-shaped bent portion. The cam hole 101 slidably engages with the upward protruded pin 87 of the main chassis 80 through the cam hole 92 of the cam plate 90. On the side face in the righthand vicinity of the cam hole 101, there is formed a rack gear portion 102, the teeth of which are partially removed at 102a in the front end portion. In the vicinity of the back end portion of the clamp starting plate 100, there is formed the link hole 100a which is slidably engaged by the start pin 63 of the insertion end detecting plate 60. Between the link hole 100a and the rack gear portion 102, there is erected a plunger receiving plate 103 which is extended to the righthand side. At the back of the cam hole 101, moreover, there is formed a guide hole 104 which is a through hole elongated longitudinally and which is engaged longitudinally slidably by the guide pin 96 of the cam plate 90. At the back of the guide hole 104, there is erected a spring receiver 105, at the back of which there is formed a through hole 106. Through this through hole 106, there is inserted the spring receiver 95 which is erected in the vicinity of the back end portion of the cam plate 90. Between the protruded end portion of the spring receiver 95 and the spring receiver 105, there is mounted a coil spring 107. Therefore, the clamp starting plate 100 is made longitudinally slidable relative to the cam plate 90 and is biased backward. So long as no forward force is applied, therefore, the clamp staring plate 100 stops the guide pin 96 in abutment against the front end portion of the guide hole 104. At this time, the plunger receiving plate 103 is located in the vicinity of the front of the plunger pin 82*a* of the electromagnetic plunger 82, and a gear 84*a* forming the first gear unit 84 is located at the tooth-removed portion 102*a* of the rack gear portion 102.

In the slot-in disk player of the pop-up type according to the construction of the invention, as shown in FIG. 1, the main chassis 80 is fixed in the player casing 2, but the openable chassis 10 can rock with respect to the player casing 2. In short, the openable chassis 10 rocks in the disk clamping action (or in the opening/closing actions of the slit 11). In the disk player of the front-loading/slot-in type shown in FIG. 2, on the other hand, the openable chassis 10 is fixed in the player casing 2, but the main chassis 80 rocks in the player casing 2. In short, the main chassis 80 rocks in the player casing 2 in the disk clamping action, as will be described in more detail.

Figure 24:
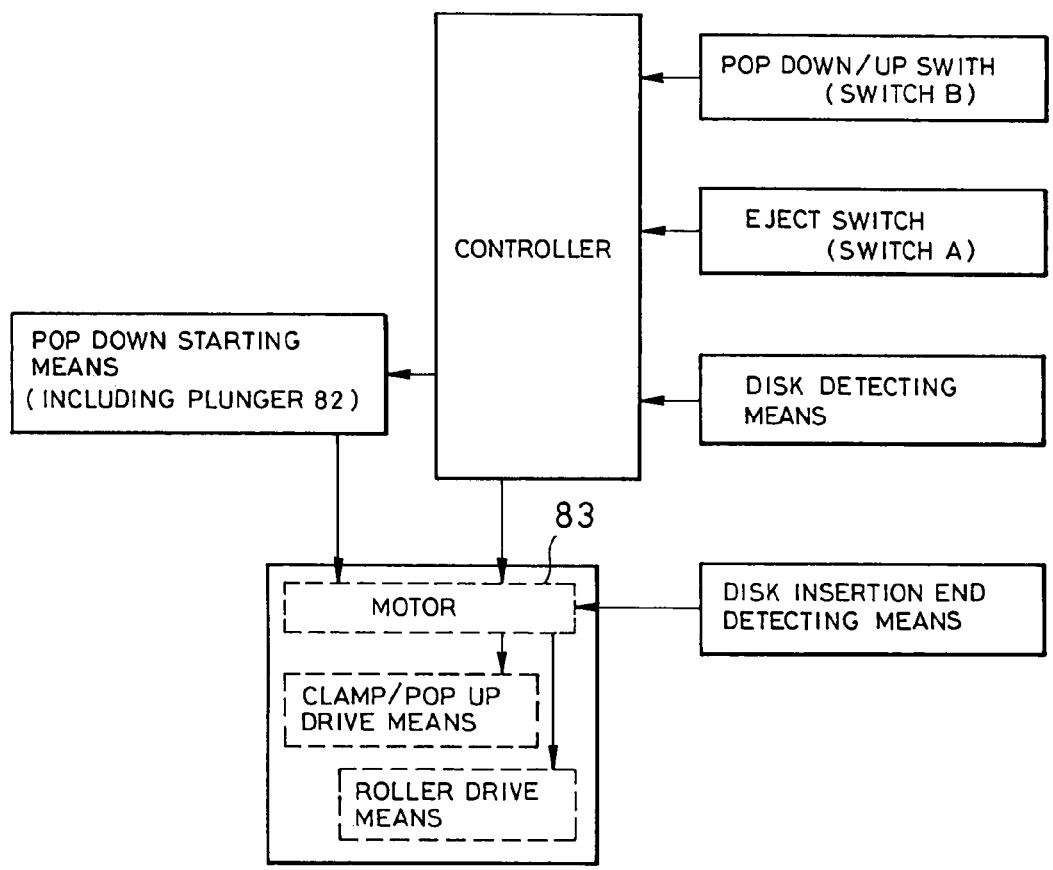
FIG. 24 is a diagram of the mechanism for a 1-motor type disk player according to the invention.

Here will be described the operation of the disk player thus constructed, and it will be described with reference to FIG. 24 or 25.

First of all, the loading of the 12 cm CD and the Maxi-CD will be described with reference to FIGS. 10 to 20.

Figure 14:
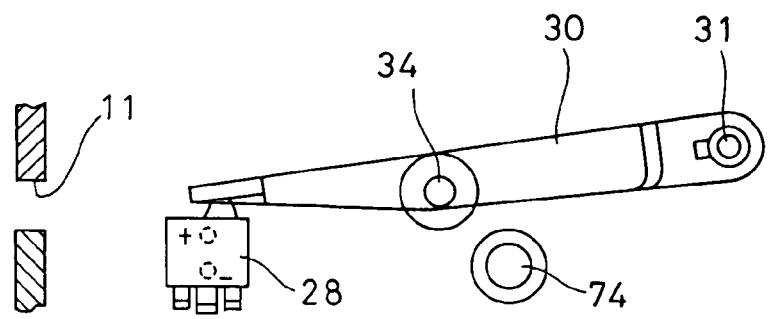
FIG. 14 is a side elevation of an essential portion of a periphery of the rocking plate before a disk is inserted.
Figure 15:
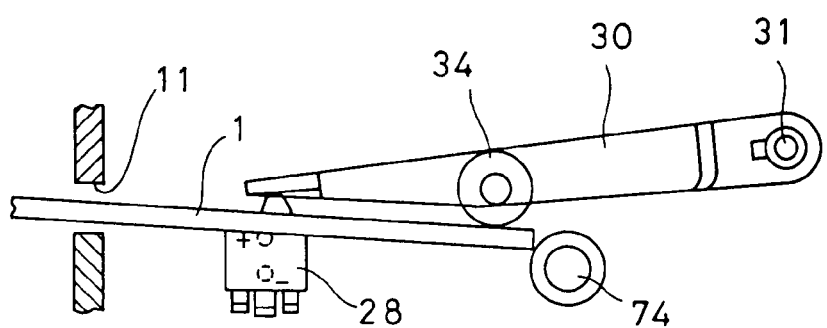
FIG. 15 is a side elevation of the essential portion of the periphery of the rocking plate when the disk is inserted.
Figure 16:
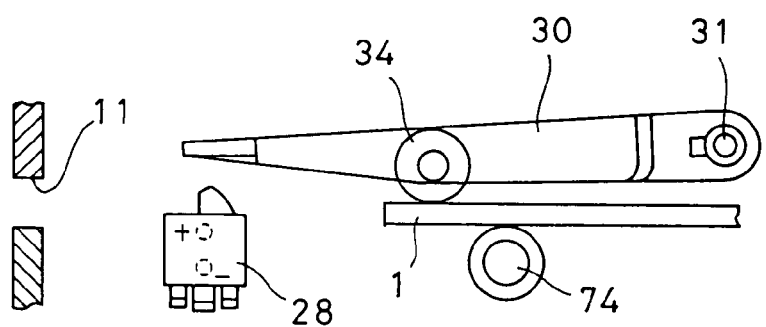
FIG. 16 is a side elevation of the essential portion of the periphery of the rocking plate while the disk is being transferred.
Figure 17:
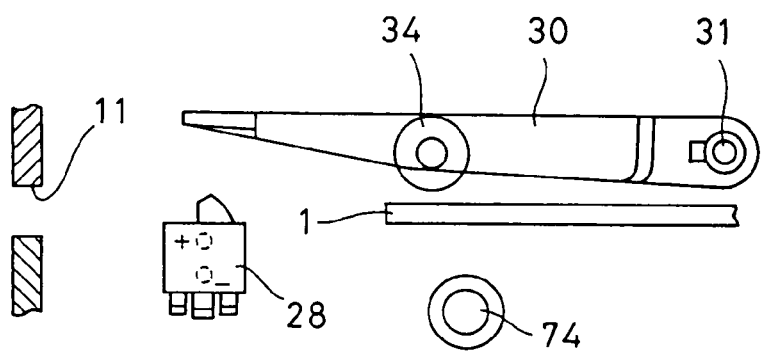
FIG. 17 is a side elevation of the essential portion of the periphery of the rocking plate when the disk is clamped on the playing mechanism.
Figure 18:
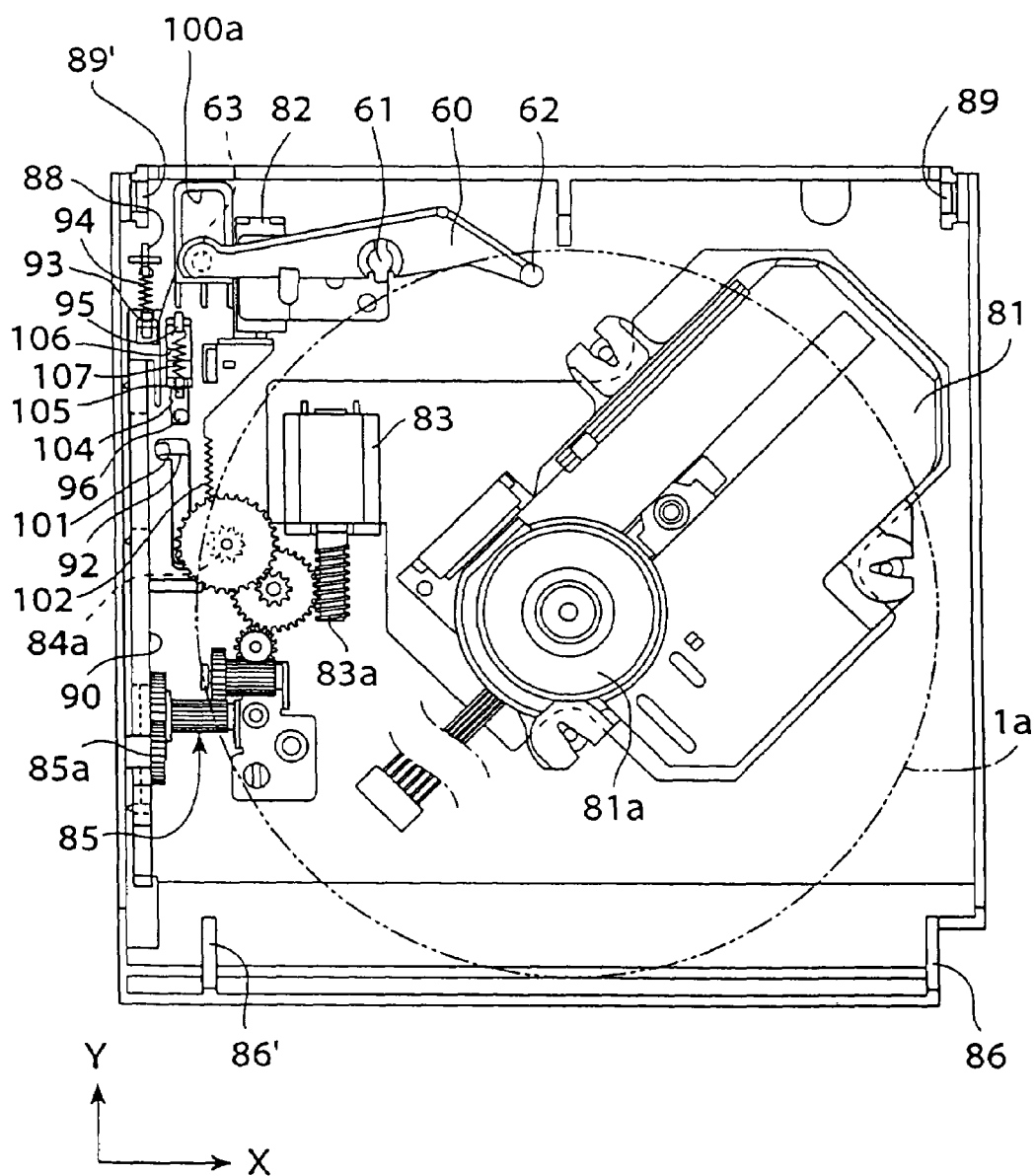
FIG. 18 is a top plan view of an essential portion of a periphery of the main chassis when a 12 cm CD or a maxi-CD is inserted.
Figure 19:
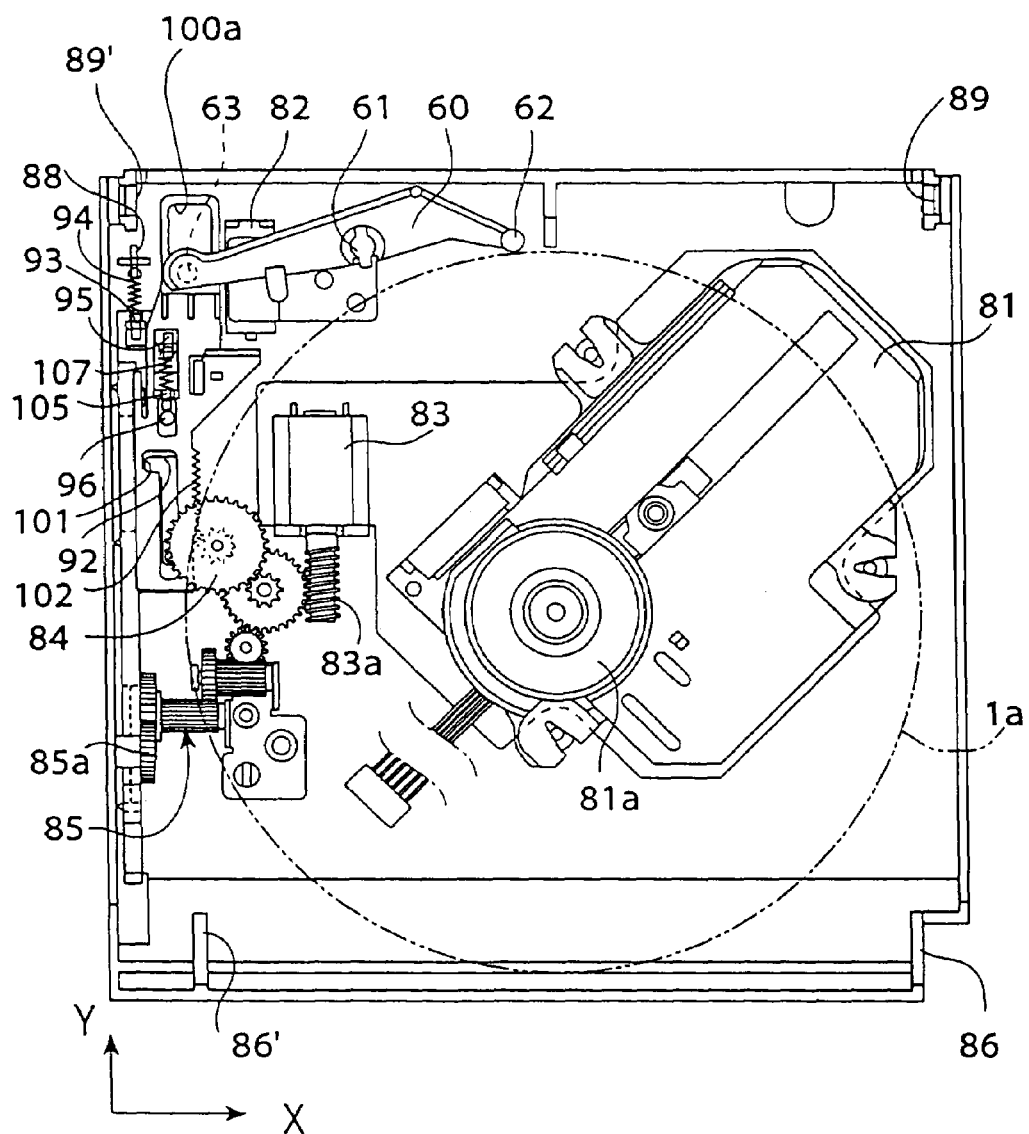
FIG. 19 is a top plan view of the essential portion of the periphery of the main chassis when the 12 cm DC or the maxi-CD is transferred to the playing mechanism.
Figure 20:
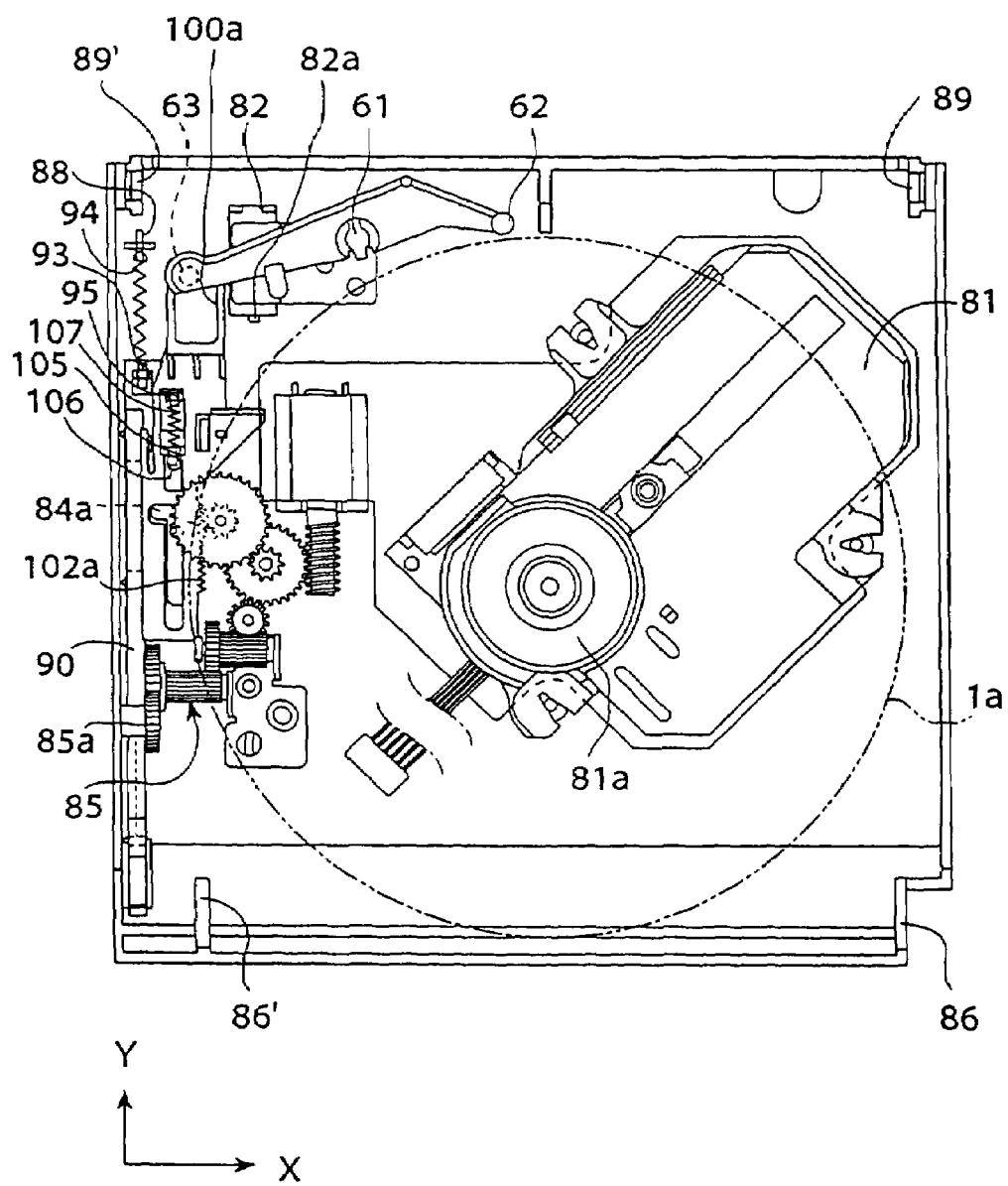
FIG. 20 is a top plan view of the essential portion of the periphery of the main chassis when the 12 cm DC or the maxi-CD is clamped on the playing mechanism.

FIGS. 10 and 14 show an insertion standby state before the disk is inserted into the slit 11. In this state, the main chassis 80 and the openable chassis 10 are farthest spaced at their individual one-end portions. Here in the disk player of the pop-up type, as shown in FIG. 1, the openable chassis 10 rises from the player casing 2 so that the aperture 3*a* is opened to expose the slit 11 to the outside of the player casing 2. On the other hand, the rocking plate 30 is in the downward rocked state, and the disk feeding follower roller 34 is located at the non-detecting position at which the disk is not inserted into the slit 11.

As a disk 1*a* is inserted by the operator into the slit 11 of the front panel 26, its leading end portion comes into abutment against the disk feeding follower roller 34 of the rocking plate 30. Since this rocking plate 30 is biased at its leading end portion to turn downward by the not-shown spring, as described hereinbefore, the disk feeding follower roller 34 pushes the upper face of the disk 1*a* to move the disk 1*a* forward. As the disk 1*a* is further inserted, its leading end portion comes into abutment against the side face of the disk feeding drive roller 74 (as should be referred to FIGS. 11 and 15).

The disk feeding drive roller 74 is made of an elastic material having a high coefficient of friction so that the inserted leading end portion of the disk 1*a* is moved forward while being raised along the roller surface 74*a*. At this time, the disk feeding follower roller 34 is pushed upward by the upper face of the disk 1*a*. As a result, the front end portion of the rocking plate 30 turns upward on the stationary pins 31 and 31' so that the disk feeding follower roller 74 is displaced normal to the disk 1*a*, i.e., in the thickness direction of the disk 1*a* from the aforementioned non-detecting position to the detecting position. Moreover, the disk feeding drive roller 74 abuts against the lower face of the disk 1*a*, and the disk feeding follower roller 34 pushes the upper face of the disk 1*a* to the disk feeding drive roller 74 so that the disk 1*a* is clamped between the disk feeding follower roller 34 and the disk feeding drive roller 74. At this time, the end portion 33 of the rocking plate 30 leaves the micro-switch 28 to turn it OFF thereby to detect the insertion of the disk 1*a*. At this time, the micro-switch 28' is ON whereas the micro-switch 28 is OFF, so that the motor 83 is activated to rotate.

Since the insertion of the disk is mechanically detected, as described above, it can be reliably detected even when the disk used is the Maxi-disk having a transparent portion at its substrate.

In order to enhance the detection accuracy of the insertion of the disk 1*a*, it is preferable that the movement of the disk feeding follower roller 34 is large. The disk 1*a* moves the disk feeding follower roller 34 upward on the abutting point against the disk feeding drive roller 74. It is, therefore, preferable that the disk feeding drive roller 74 and the disk feeding follower roller 34 are spaced in the proceeding direction of the disk 1*a*.

The motor 83 rotates the first gear unit 84 and the second gear unit 85 through the worm gear 83*a* and the distribution gear 83*b*. However, the gear 84*a* of the first gear unit 84 is located in the removed portion 102*a* of the rack gear portion 102 so that it rotates idly. On the other hand, the gear 85*a* of the second gear unit 85 rotates the drive gear 75 fixed on the disk feeding drive roller 74, to rotate the disk feeding drive roller 74. Therefore, the disk 1*a* is automatically pulled backward of the slit 11, while being clamped together with the disk feeding follower roller 34, by the frictional force of the roller surface 74*a* of the disk feeding drive roller 74 (as should be referred to FIGS. 12 and 16).

Here, the length of the slit 11 is substantially equal to the diameter of the 12 cm CD so that the center axis of the disk 1*a* is directed toward the turntable 81*a* as it passes through the slit 11.

As the disk 1*a* is automatically pulled in backward, the disk detecting pin 43 of the disk diameter detecting plate 40, as located on the proceeding passage of the disk 1*a*, comes into abutment against the side edge portion of the disk 1*a* so that it is moved to the righthand side. The disk diameter detecting plate 40 turns counter-clockwise, as viewed downward, on the bearing 16 so that the bent portion 40*a* of the disk diameter detecting plate 40 and the pin 52*a* of the disk holding plate 50*a* are disengaged from each other. Therefore, the disk holding plates 50*a* and 50*b* are allowed to turn freely on the bearings 19*a* and 19*b*, respectively.

Subsequently, the side edge portion in the vicinity of the inserted leading end portion of the disk 1*a* comes into abutment against the pin 52*a* of the disk holding plate 50*a* and the pin 52*b* of the disk holding plate 50*b* to expand the pins 52*a* and 52*b* away from each other. Since the disk holding plates 50*a* and 50*b* turn in synchronism with each other, as described hereinbefore, the disk 1*a* abuts against the pins 52*a* and 52*b* so that its center is brought to a position where it is accurately clamped on the turntable 81*a*.

When the disk 1*a* is further pulled in to the back, the side edge portion in the vicinity of the inserted leading end portion of the disk 1*a* comes into abutment of the disk pin 62 of the insertion end detecting plate 60. This insertion end detecting plate 60 turns counter-clockwise, as viewed downward, on the mounting shaft 61 (as should be referred to FIGS. 18 and 19). Then, the start pin 63 of the insertion end detecting plate 60 moves to the front end portion of the link hole 10*a* of the clamping starting plate 100 to push the clamp starting plate 100 slightly forward. Then, the gear 84*a* of the first gear unit 84 meshes with the rack gear portion 102 to move the cam plate 90 forward.

The guide pin 96, as embedded in the cam plate 90, comes into abutment against the back end portion of the guide hole 104 of the clamp starting plate 100 so that the cam plate 90 and the clamp starting plate 100 proceed together forward.

The cam pin 76 of the drive roller holder 70 moves backward while sliding in the clamp cam hole 91 of the horizontal plate portion 90*b*. Having passed through the bent portion of the clamp cam hole 91, the cam pin 76 is moved downward.

In accordance with this downward movement of the cam pin 76, the drive roller holder 70 turns on the pins 73 and 73' to move the pins 72 and 72' downward. At this time, the disk feeding drive roller 74 leaves the lower face of the disk 1*a*.

In accordance with the turning motion of the drive roller holder 70, the openable chassis 10 in engagement with the pins 72 and 72' of the drive roller holder 70 turns on the stationary pins 29 and 29'. Therefore, the disk clamping action starts so that the clamper 38 moves toward the turntable 81*a*. The front end portion of the openable chassis 10 and the front end portion of the main chassis 80 come closer to each other to bring the openable chassis 10 and the drive roller holder 70 into abutment. Here, the protruded end portion of the projection 71 of the drive roller holder 70 comes into abutment against the rocking plate 30 to push the same upward so that the drive roller holder 70 turns on the stationary pins 31 and 31'. Therefore, the disk feeding follower roller 34 leaves the upper face of the disk 1*a* (as should be referred to FIG. 17). On the other hand, the disk 1*a* is located in the disk relief groove 70*a* formed in the surface of the drive roller holder 70 so that the disk 1*a* does not abut against the drive roller holder 70.

The clamper holding member 35 moves downward together with the openable chassis 10 to bring the notch 35*b* formed in the depending portion 35*a* and the clamper stopper pin 35*c* projected from the main chassis 80 out of engagement. Therefore, the clamper holding member 35 turns on the clamper fixing pins 37 and 37' by the not-shown spring so that the disk 1*a* is clamped on the turntable 81*a* by the clamper 38.

Here in the slot-in disk player of the pop-up type, as shown in FIG. 1, at the time of the aforementioned clamping action, the openable chassis 10 is accommodated in the aperture 3*a* of the panel portion 3 so that the slit 11 is hidden in the player casing 2 (in the pop-down state). In short, the disk is played in the pop-down state. In the disk player of the front-loading/slot-in type shown in FIG. 2, on the other hand, the openable chassis 10 is fixed in the player casing 2. At the time of the clamping action, therefore, the main chassis 80 turns toward the openable chassis 10 in accordance with the turning motion of the drive roller holder 70.

Figure 13:
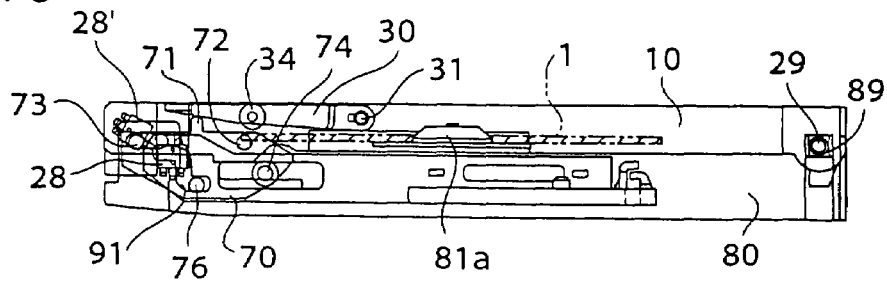
FIG. 13 is a side elevation of the essential portion of the disk player when the disk is clamped on the playing mechanism.

The cam pin 76 of the drive roller holder 70 proceeds in the horizontal portion of the clamp cam hole 91 and reaches the back end portion (as should be referred to FIG. 13). The front end portion of the cam plate 90 comes into abutment against the micro-switch 28' so that this micro-switch 28' is turned OFF to stop the rotation of the motor 83. The movements of the cam plate 90 and the clamp starting plate 100 are also stopped. During the movement of the cam plate 90, the clamp starting plate 100 also moves so that the start pin 63 of the insertion end detecting plate 60 is further pushed forward by the abutment against the back end portion of the ring hole 100*a*. Therefore, the disk pin 62 is turned backward away from the side edge portion of the disk 1*a*. By the insertion end detecting plate 60, on the other hand, the mounting portion 60*a* of the disk holding plate 50*b* also receives the backward force so that the pins 52*a* and 52*b* of the disk holding plates 50*a* and 50*b* are also carried away from the disk.

The disk 1*a* can be played by the actions thus far described.

When the disk 1*a* having been played is to be discharged, the operator controls a not-shown switch A disposed on the front panel 26 to start the discharge. Here, these discharging actions may be reversed from the aforementioned ones for playing the disk so that they are not described in detail. These actions are stopped when all the members are returned to the initial states where the disk 1*a* is inserted by the spring and so on.

Here will be described the case in which the disk player is to be loaded at its play position with a disk such as the 8 cm CD having a smaller diameter than that of the aforementioned 12 cm CD.

Figure 21:
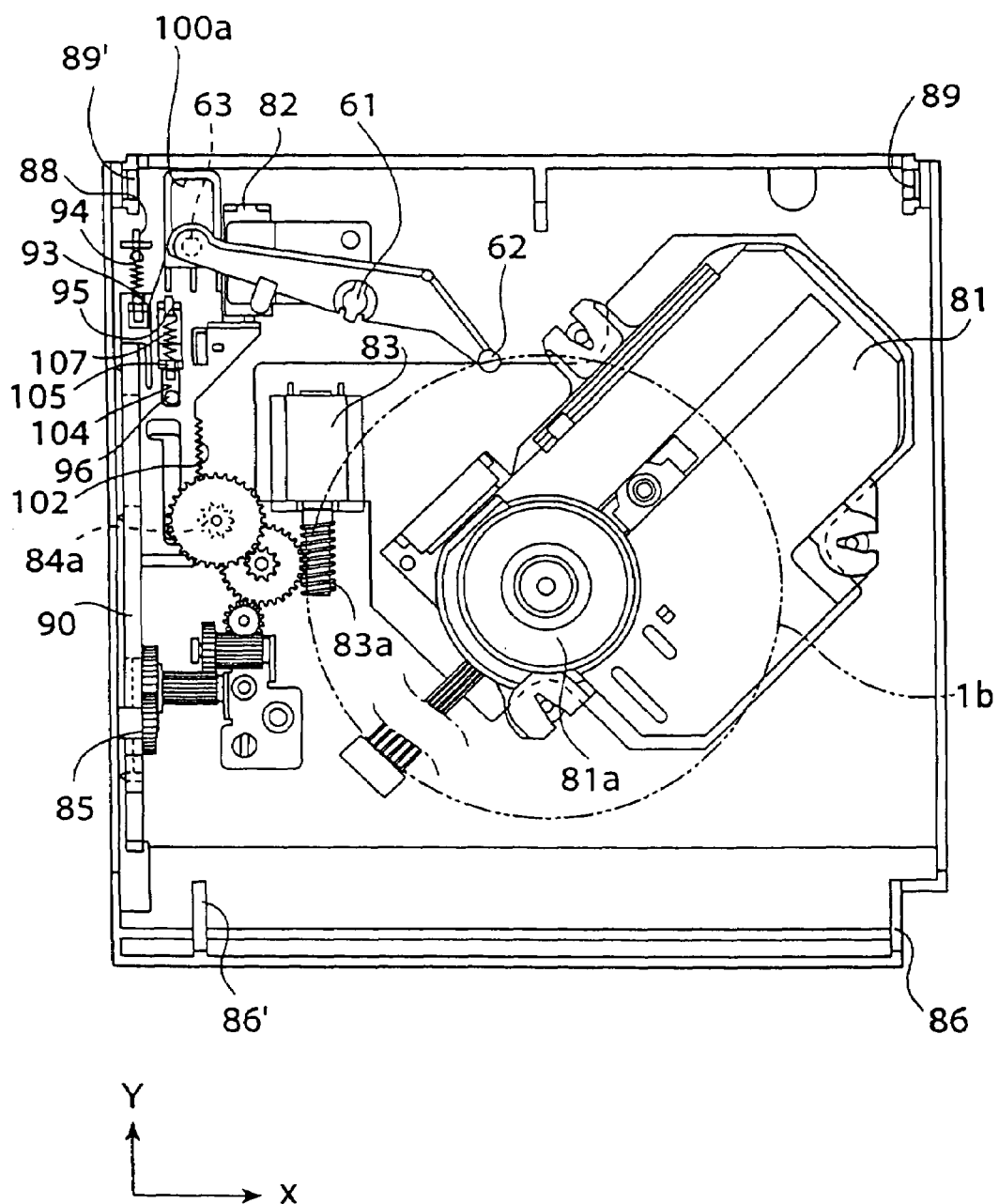
FIG. 21 is a top plan view of the essential portion of the periphery of the main chassis when an 8 cm CD is inserted.
Figure 22:
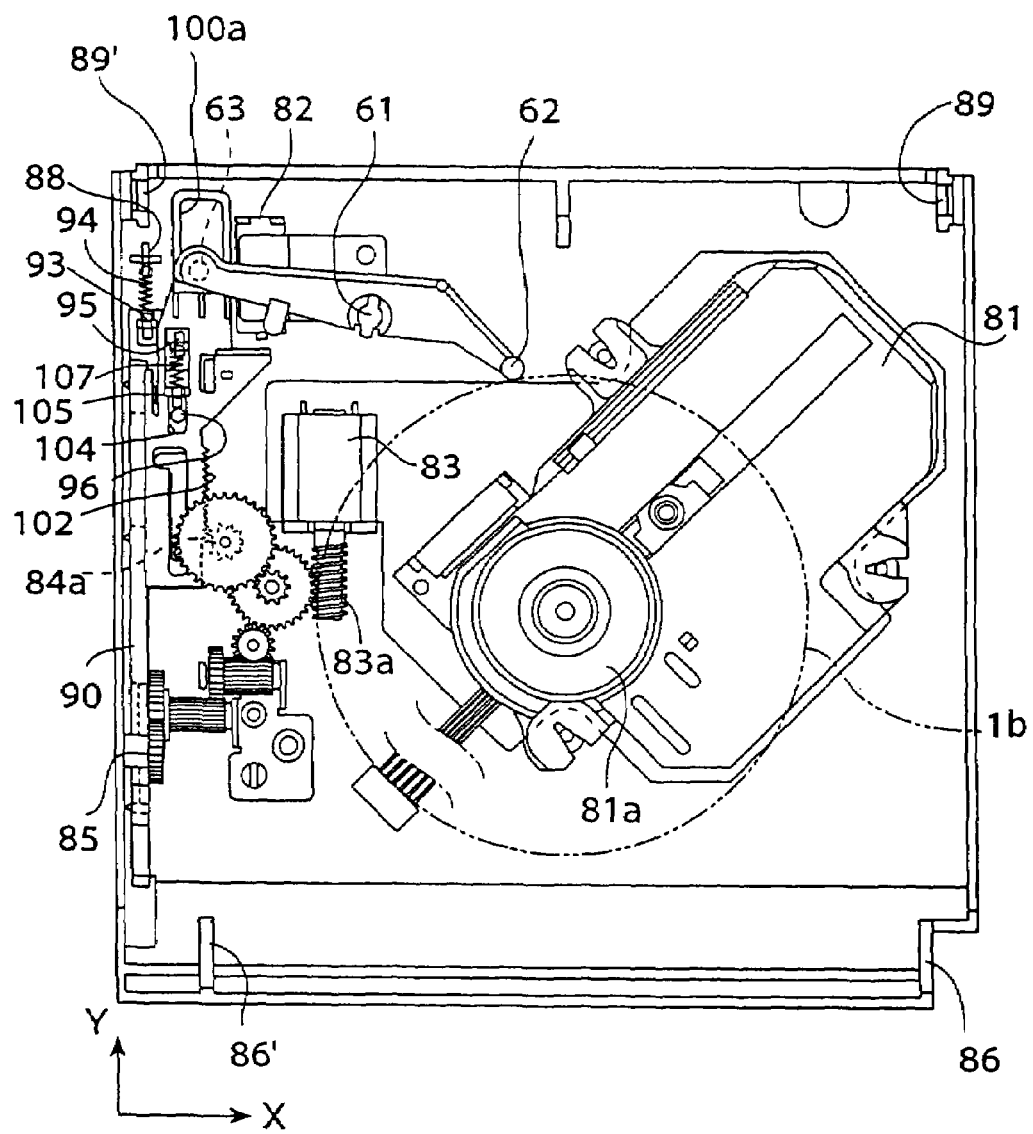
FIG. 22 is a top plan view of the essential portion of the periphery of the main chassis when the 8 cm DC is transferred to the playing mechanism.
Figure 23:
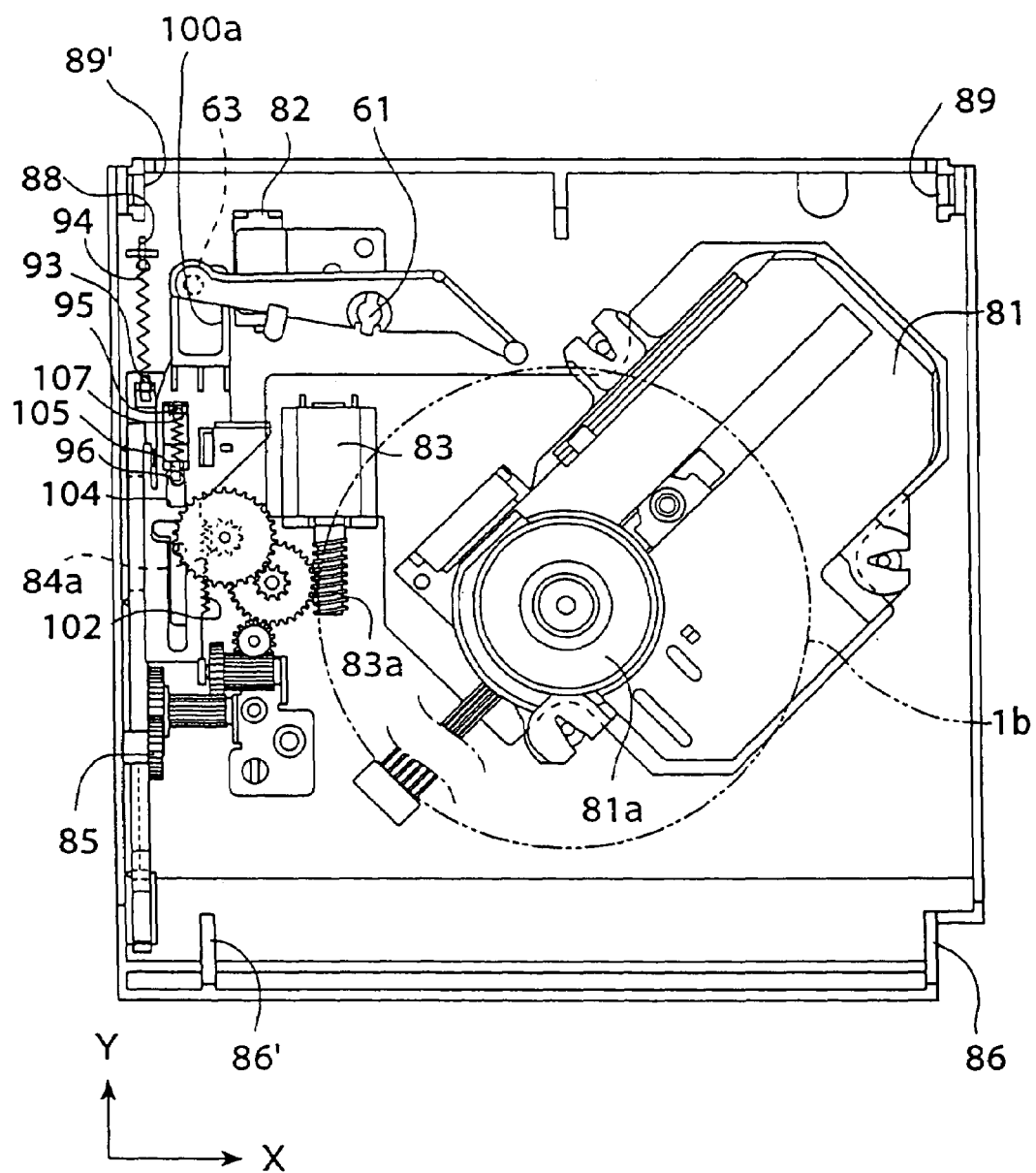
FIG. 23 is a top plan view of the essential portion of the periphery of the main chassis when the 8 cm DC is clamped on the playing mechanism.

With further reference to FIGS. 21 to 23, the operator inserts a disk 1*b* into the slit 11 of the front panel 26 as in the aforementioned case of playing the 12 cm CD or the like. Then, the motor 83 rotates so that the disk 1*b* is automatically pulled in to the back of the slit 11. At this time, the disk 1*b* has a diameter smaller than the length of the slit 11 so that it can move freely in the transverse directions. If the disk 1*b* is pulled in with an offset to the lefthand side from the center of the slit 11, therefore, it cannot push the disk detecting pin 43 of the disk diameter detecting plate 40 rightward so that the bent portion 40*a* of the disk diameter detecting plate 40 and the pin 52*a* of the disk holding plate 50*a* keeps their engagement. The disk holding plates 50*a* and 50*b* do not change their relative positions, but the disk 1*b* is pulled backward while correcting its transverse positions in abutments against the pin 52*a* of the disk holding plate 50*a* and the pin 52*b* of the disk holding plate 50*b*. The position where the disk 1*b* abuts against both the pins 52*a* and 52*b* is located where the center of the disk 1*b* is clamped so that it can be arranged on the turntable 81*a*.

When the disk 1*b* is pulled in with an offset to the righthand side from the slit 11, on the other hand, it pushes the disk detecting pin 43 of the disk diameter detecting plate 40 rightward to release the engagement between the bent portion 40*a* of the disk diameter detecting plate 40 and the pin 52*a* of the disk holding plate 50*a*.

When the disk 1*b* is further pulled in up to the position where it abuts against the pins 52*a* and 52*b* of the disk holding plates 50*a* and 50*b*, it leaves the disk detecting pin 43 of the disk diameter detecting plate 40. Therefore, the bent portion 40*a* of the disk diameter detecting plate 40 and the pin 52*a* of the disk holding plate 50*a* restore their engagement so that the disk holding plates 50*a* and 50*b* come into a locked state. In other words, the disk 1*b* is transversely corrected to the position where it abuts against both the pin 52*a* of the disk holding plate 50*a* and the pin 52*b* of the disk holding plate 50*b*, so that it is positioned on the turntable 81*a*.

Here, the disk holding plate 50*b* has not turned backward unlike the case of the 12 cm CD so that the mounting shaft 61 of the insertion end detecting plate 60 is located in front of the position of the case for the 12 cm CD. Although the diameter of the disk 1*b* is smaller than that of the 12 cm CD, therefore, the disk pin 62 of the insertion end detecting plate 60 comes into abutment against the side edge portion of the disk 1*b*.

When the disk 1*b* is pulled backward to turn the insertion end detecting plate 60, the start pin 63 moves to the front end portion of the link hole 10*a* of the clamp starting plate 100 to move the clamp starting plate 100 and so on in engagement therewith.

The subsequent actions are similar to those of the case of the 12 cm CD so that their description will be omitted.

On the other hand, the case of discharging the disk 1*b* is also similar.

Next, in the case of constructing the aforementioned disk player of the pop-up type of FIG. 1, it may be desired to open/close the openable chassis 10 without inserting the disk 1. First of all, before the use of the player, the accommodation state in which the openable chassis 10 is accommodated in the aperture 3a shifts to the disk insertion standby state in which the openable chassis 10 protrudes from the disk casing 2, as shown in FIGS. 10 and 14. After the played disk was discharged, the openable chassis 10 is returned from the insertion standby state to the accommodation state without inserting any new disk.

When the openable chassis 10 is closed without inserting the disk 1, a not-shown switch B, as disposed on the front panel, is operated by the operator. Then, the electric power is fed to the motor 83 and the plunger 82. The motor 83 is activated to rotate, and the plunger pin 82a of the plunger 82 pushes the plunger receiving plate 103 forward. Therefore, the clamp starting plate 100 is pushed forward so that the gear 84a of the first gear unit 84 comes into meshing engagement with the rack gear portion 102 of the clamp starting plate 100.

The subsequent actions are similar to those of the case in which the disk player is to be loaded at its play position with the 12 cm CD or the like, so that their description will be omitted.

Here, the driving force of the motor 83 is transmitted to the rack gear portion 102 by using the start of the plunger 82 as the trigger, as described hereinbefore, so that the opening/closing action of the openable chassis 10 can be quickly started.

On the other hand, the action to open the openable chassis 10 without the disk 1 being arranged on the play mechanism 81 is started, for example, when the operator operates the not-shown switch A disposed on the front panel 26. The actions are similar to those of discharging the 12 cm CD having been played, so that their detailed description will be omitted.

According to the disk player of the invention, as has been described hereinbefore, the slot to receive the disk can be accommodated in the player body and closed while the disk is being played, so that the player body can be cleared of the dust which might otherwise come from the outside. Thus, it is possible to provide a disk player having a high operation reliability.

What is claimed is:

1. A disk player, comprising:
   a main chassis for enclosing play means for playing a disk;
   a receiving module having a slot in which the disk is to be inserted;
   disk transfer means for transferring the disk inserted into said slot;
   disk detecting means for detecting a position of the disk inserted; and
   drive means for moving said receiving module between a closed position and an opened position spaced from said closed position,
   wherein the disk player further comprises switch means controlled by user for issuing a drive starting command signal to start driving said drive means, wherein said disk detecting means generates a detection signal when said disk arrives at a predetermined position,
   wherein said drive means moves said receiving module from said opened position to said closed position in response to one of the detection signal from said disk detecting means and the command signal from said switch means,
   wherein said drive means includes a link member, and wherein said link member is rotatably hinged at its one end portion to said receiving module and engages at its other end portion rotatably and slidably with said main chassis,
   wherein said transfer means is arranged on said link member, and
   wherein said transfer means is a roller.

2. A disk player, comprising:
   a main chassis for enclosing play means for playing a disk;
   a receiving module having a slot in which the disk is to be inserted;
   disk transfer means for transferring the disk inserted into said slot;
   disk detecting means for detecting a position of the disk inserted; and
   drive means for moving said receiving module between a closed position and an opened position spaced from said closed position,
   wherein the disk player further comprises switch means controlled by user for issuing a drive starting command signal to start driving said drive means, wherein said disk detecting means generates a detection signal when said disk arrives at a predetermined position,
   wherein said drive means moves said receiving module from said opened position to said closed position in response to one of the detection signal from said disk detecting means and the command signal from said switch means,
   wherein said drive means includes a link member, and wherein said link member is rotatably hinged at its one end portion to said receiving module and engages at its other end portion rotatably and slidably with said main chassis,
   wherein said drive means includes stress applying means for moving the two end portions of said link member toward said main chassis,
   wherein said transfer means is arranged on said link member, and
   wherein said transfer means is a roller.

* * * * *